(12) United States Patent
Bouzid

(10) Patent No.: US 11,543,639 B2
(45) Date of Patent: Jan. 3, 2023

(54) MACRO-MICRO TELECENTRIC SCANNING SYSTEMS AND METHODS

(71) Applicant: Li-Cor, Inc., Lincoln, NE (US)

(72) Inventor: Ahmed Bouzid, Lincoln, NE (US)

(73) Assignee: Li-Cor, Inc., Lincoln, NE (US)

( * ) Notice: Subject to any disclaimer, the term of this patent is extended or adjusted under 35 U.S.C. 154(b) by 304 days.

(21) Appl. No.: 16/752,483

(22) Filed: Jan. 24, 2020

(65) Prior Publication Data
US 2020/0241269 A1 Jul. 30, 2020

Related U.S. Application Data

(60) Provisional application No. 62/798,332, filed on Jan. 29, 2019.

(51) Int. Cl.
*G02B 21/00* (2006.01)
*G01N 21/64* (2006.01)
(Continued)

(52) U.S. Cl.
CPC .......... *G02B 21/002* (2013.01); *G01N 21/64* (2013.01); *G02B 21/02* (2013.01); *G01S 17/89* (2013.01)

(58) Field of Classification Search
CPC ............... G02B 21/002; G02B 21/008; G02B 21/0032; G02B 21/0052; G02B 21/0072; G02B 21/0076; G02B 21/0084; G02B 21/02; G02B 21/06; G02B 21/086; G02B 21/16; G02B 21/18; G02B 21/24; G02B 21/26; G02B 21/32; G02B 21/34;
(Continued)

(56) References Cited

U.S. PATENT DOCUMENTS

| 4,755,874 A | * | 7/1988 | Esrig | G01N 21/95607 348/126 |
| 2009/0160994 A1 | * | 6/2009 | Ganser | G02B 21/18 348/333.01 |

(Continued)

OTHER PUBLICATIONS

Written Opinion of the International Search Authority, dated May 22, 2020 in Application No. PCT/US2020/015351.

(Continued)

*Primary Examiner* — Mustak Choudhury
(74) *Attorney, Agent, or Firm* — Gerald T. Gray; Leydig, Voit & Mayer, LTD

(57) ABSTRACT

Dual mode imaging systems and methods for macroscopic and microscopic imaging using the same optical imaging system (OIS). The various embodiments enable controllable and/or automated switching between macroscopic imaging and microscopic imaging modes. A dual mode imaging system includes a sample platform movable relative to an OIS between first and second locations, and a light source subsystem configured to generate and project an illumination beam onto a focal plane. When in the first location, the sample platform coincides with the focal plane, and the OIS receives light from the sample platform along a first detection light path. When in the second location, the illumination beam interacts with relay optics and impinges on the sample platform through an objective lens, and the light from the sample platform is directed back through the objective lens and relay optics to the OIS via the first detection path.

20 Claims, 19 Drawing Sheets

(51) Int. Cl.
*G02B 21/02* (2006.01)
*G01S 17/89* (2020.01)

(58) Field of Classification Search
CPC ...... G02B 21/36; G02B 21/64; G02B 21/241;
G02B 21/244; G02B 21/245; G02B
21/361; G02B 21/365; G02B 21/367;
G02B 7/38; G01S 17/89; G01N 21/6456
See application file for complete search history.

(56) References Cited

U.S. PATENT DOCUMENTS

| | | | |
|---|---|---|---|
| 2009/0284833 A1* | 11/2009 | Shimamoto | G02B 27/141 359/385 |
| 2010/0310139 A1* | 12/2010 | Kimura | G02B 21/0076 382/128 |
| 2012/0120302 A1 | 5/2012 | Kiyota et al. | |
| 2015/0370058 A1 | 12/2015 | Bouzid | |
| 2018/0356621 A1 | 12/2018 | Ward et al. | |

OTHER PUBLICATIONS

International Search Report of the International Search Authority, dated May 22, 2020 in Application No. PCT/US2020/015351.
Supplementary European Search Report from the European Patent Office on EP Application No. 20752410.

* cited by examiner

MACRO-MICRO TELECENTRIC SCANNING SYSTEMS AND METHODS

CROSS REFERENCES TO RELATED APPLICATIONS

This Patent Application claims priority to U.S. Provisional Patent Application No. 62/798,332, entitled "MACRO-MICRO TELECENTRIC SCANNING SYSTEMS AND METHODS," filed Jan. 29, 2019, which is incorporated herein by reference in its entirety.

SUMMARY

Various embodiments advantageously provide systems and methods for macroscopic imaging of a sample and microscopic imaging of the sample using the same optical imaging system. In certain embodiments, the systems and methods advantageously enable controllable and/or automated switching between macroscopic imaging and microscopic imaging modes.

The various embodiments advantageously enable optimized quantitative measurements of the sample plane, e.g., one or more targets of interest at or on the sample plane, which may be applicable for various scientific applications, such as fluorescent imaging.

According to an embodiment, a dual mode imaging system is provided that includes a sample platform configured to hold a sample that may include one or more targets of interest within or on the sample, the sample platform being movable relative to an optical imaging system between a first location and a second location, and a light source subsystem including an illumination source configured to generate an illumination beam, the light source subsystem comprising beam-shaping optics configured to project the illumination beam onto a part of a focal plane. The system also includes relay optics configured to receive and redirect the illumination beam through an objective lens when the sample platform is in the second location, a detector subsystem for detecting light from the sample platform, and comprising a light detector having an array of sensing locations, and the optical imaging system, which includes optical elements configured to receive light from the sample platform along a first detection light path and to pass or to direct the received light to the light detector along a second detection light path. In operation, when the sample platform is in the first location, the sample platform coincides with the focal plane, the illumination beam impinges on at least a portion of the sample platform, and the optical imaging system receives light from the portion of the sample platform along the first detection light path, and when the sample platform is in the second location the illumination beam interacts with the relay optics and impinges on at least a portion of the sample platform through the objective lens and the light from the portion of the sample platform is directed back through the objective lens and relay optics and to the optical imaging system along the first detection path. In certain aspects, the optical imaging system includes a bi-telecentric optical imaging system.

According to another embodiment, a dual mode imaging system is provided that includes a sample platform configured to hold a sample that may include one or more targets of interest within or on the sample, a detector subsystem for detecting light from the sample platform, and comprising a light detector having an array of sensing locations, and an optical imaging system comprising optical elements configured to receive light from the sample platform along a first detection light path and to pass or to direct the received light to the light detector along a second detection light path. The system also includes relay optics configured to receive and redirect the light from the sample platform through an objective lens when the sample platform is in a second location relative to the optical imaging system, and an illumination source configured to generate illumination and direct the illumination to impinge on at least a portion of the sample platform from a side opposite a side on which the optical imaging system is located, wherein the sample platform is movable relative to the optical imaging system between a first location and the second location. In operation, when the sample platform is in the first location, the optical imaging system receives light directly from a portion of the sample platform along the first detection light path, and when the sample platform is in the second location light from the portion of the sample platform is directed back through the objective lens and the relay optics and to the optical imaging system along the first detection path.

In certain aspects, the systems described herein may further include a control system module including at least one processor, wherein the control system module is communicably coupled with and adapted to control operation of the system components, such as the lasers, light source subsystem, the detector subsystem, various adjustable optical components such as a scanning mirror, adjustable mechanical components, such as mechanical actuators for adjusting or translating physical positions of various components such as optical components, light sources, lasers, a stage or platform that holds the sample, which may include one or more targets of interest, etc.

In certain aspects, a sample may include one or more targets of interest, and the optical imaging system is configured to image the one or more targets of interest onto the light detector wherein the system is a fluorescence imaging system. In certain aspects, the one or more targets of interest (e.g., within or on a sample, which may be located on a sample platform) may comprise a fluorescent material, and the illumination beam has a wavelength in an absorption band of the fluorescent material comprised within the one or more targets of interest.

According to another embodiment, a method of imaging a sample using a dual mode imaging system is provided. The method includes providing a sample on the sample platform, and generating an illumination beam by the illumination source. The sample may include one or more targets of interest on or within the sample. The method also includes imaging the sample in a macro-imaging mode by automatically positioning the sample platform in the first location, wherein the illumination beam impinges directly on at least a portion of the sample platform and wherein light from the portion of the sample platform passes directly to the detector system, and capturing an image of the sample and/or one or more targets of interest using the detector system. The method also includes imaging the sample in a micro-imaging mode by automatically positioning the sample platform in the second location, wherein the illumination beam is redirected through an objective lens toward at least a portion of the sample platform by relay optics, and wherein light from the portion of the sample platform passes back through the objective lens and relay optics to the detector system, and capturing an image of the sample and/or one or more targets of interest using the detector system, wherein a resolution of the image captured in the micro-imaging mode is greater than a resolution of the image captured in the macro-imaging mode.

In a further embodiment, a non-transitory computer readable medium is provided that stores instructions, which when executed by the at least one processor, causes the at least one processor to control operation of the system components and to implement any method as described herein. Examples of computer readable media include RAM, ROM, CDs, DVDs, ASICs, FPGAs or other circuit elements including memory elements.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

DETAILED DESCRIPTION

Various system and method embodiment are provided for macroscopic and microscopic imaging of a sample and/or one or more targets of interest on or within the sample. In certain embodiments, the systems and methods advantageously enable macroscopic and microscopic imaging of a sample and/or one or more targets of interest on or within the sample using the same imaging system and the same illumination system, and enable optical macroscopic imaging as well as microscopic imaging as means to zoom-in and see more detail at desired locations on or within the sample. Such information may be useful for research scientists who would like to know more detail, such as where in a cell a certain tracer or dye molecule is located, for example.

Certain embodiments herein provide the benefits of a bi-telecentric imaging system for large area scanning (macro-scanning) and also allow zooming in with higher microscopic magnification using the same bi-telecentric imaging system (micro-scanning). System and method embodiments provide a quantitative, fast, sensitive scanner with the ability to implement direct macroscopic scanning, without the limitation of microscope objectives, and also implement microscopic scanning through a microscope objective.

The embodiments herein are useful for point-scan imaging and line-scan imaging applications.

Figure 1:
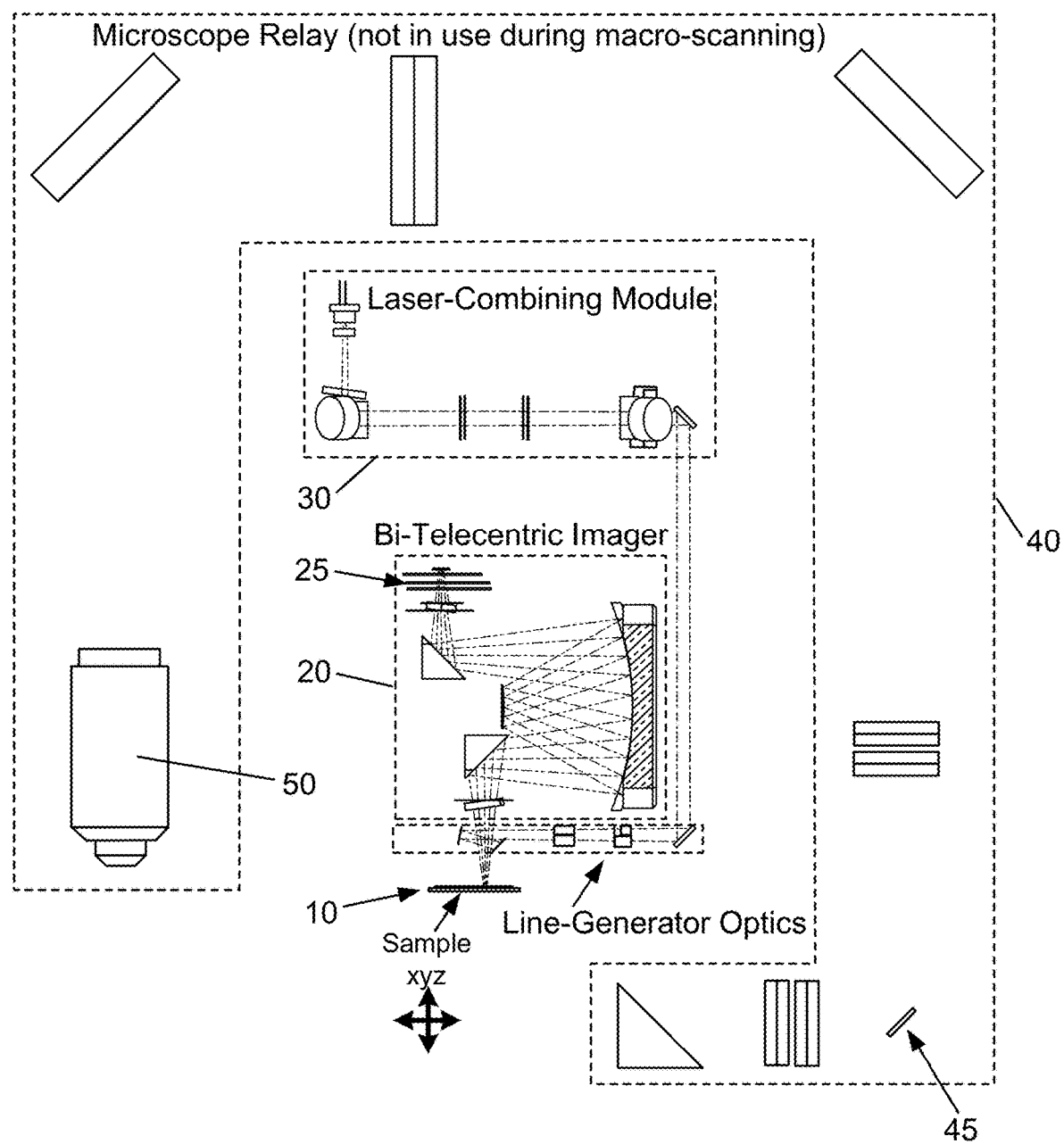
FIG. 1 shows a macro-micro imaging system operating in a macro-scanning mode, according to an embodiment.

According to an embodiment, a method includes initially scanning a large sample area, for example a microscope slide, in a macro-imaging or macro-scanning mode at a few-micron to hundreds of micron resolution. This is accomplished, in certain embodiments, by scanning using the bi-telecentric line-scanning imager as depicted in FIG. 1. The sample and/or the imaging optics can be scanned mechanically to cover a large area. The macro-scan mode maintains the benefits of the bi-telecentric scanning of a large area at relatively fast speed as described in U.S. Pat. No. 9,541,750, which is hereby incorporated by reference. For example, as shown in FIG. 1, in the macro-imaging mode, a sample platform 10 is located in a first location proximal to imaging system 20. As an example, in an embodiment, the sample platform 10 is located at a first location that coincides with a part of a focal plane of a light source system 30 including an illumination source that generates an illumination beam. The light source system 30 includes beam-shaping optics configured to direct and project the illumination beam onto the part of the focal plane. The beam-shaping optics may include one or more optical elements configured to reshape a profile of the illumination beam to a line-shaped profile at the focal plane. A detector subsystem 25 receives light emanating from the sample platform via the imaging system 20, and includes at least one light detector having an array of sensing locations.

In certain embodiments, the light source system 30 may include a laser-combining module for combining laser beams output by two or more different lasers. For example, certain embodiments include a laser-beam combining module that enables combining beams from two types of lasers, single-mode (SM) laser diodes and multi-mode (MM) laser diodes, to travel down a common path (simultaneously) and to efficiently create a uniform laser spot or line at a sample plane, with minimal loss of optical power from both types of lasers. Embodiments also enable illumination of a sample plane by way of multi-wavelength laser beams passing though the same optical system along the same path with uniform motion. With SM and MM laser beams having varying beam sizes in both the x- and y-direction, the embodiments provide optics that influence the beam size to allow for simultaneous use of both types of lasers. U.S. Provisional Patent Application No. 62/789,094, filed Jan. 7, 2019, and U.S. Non-Provisional patent application Ser. No. 16/734,731, filed Jan. 6, 2020, both titled "Laser Line Illumination using Combined Single-Mode and Multi-Mode Laser Sources," disclose embodiments, aspects and features of combining SM and MM illumination beams, and are both incorporated by reference herein for all purposes.

When desired, a user may instruct the system to move the sample platform 10 to one or more desired locations within the macro-scan area and activate a micro-scanning mode. The system may also be configured to automatically move the sample platform 10 and switch imaging modes after an imaging mode has finished imaging/scanning.

Figure 2:
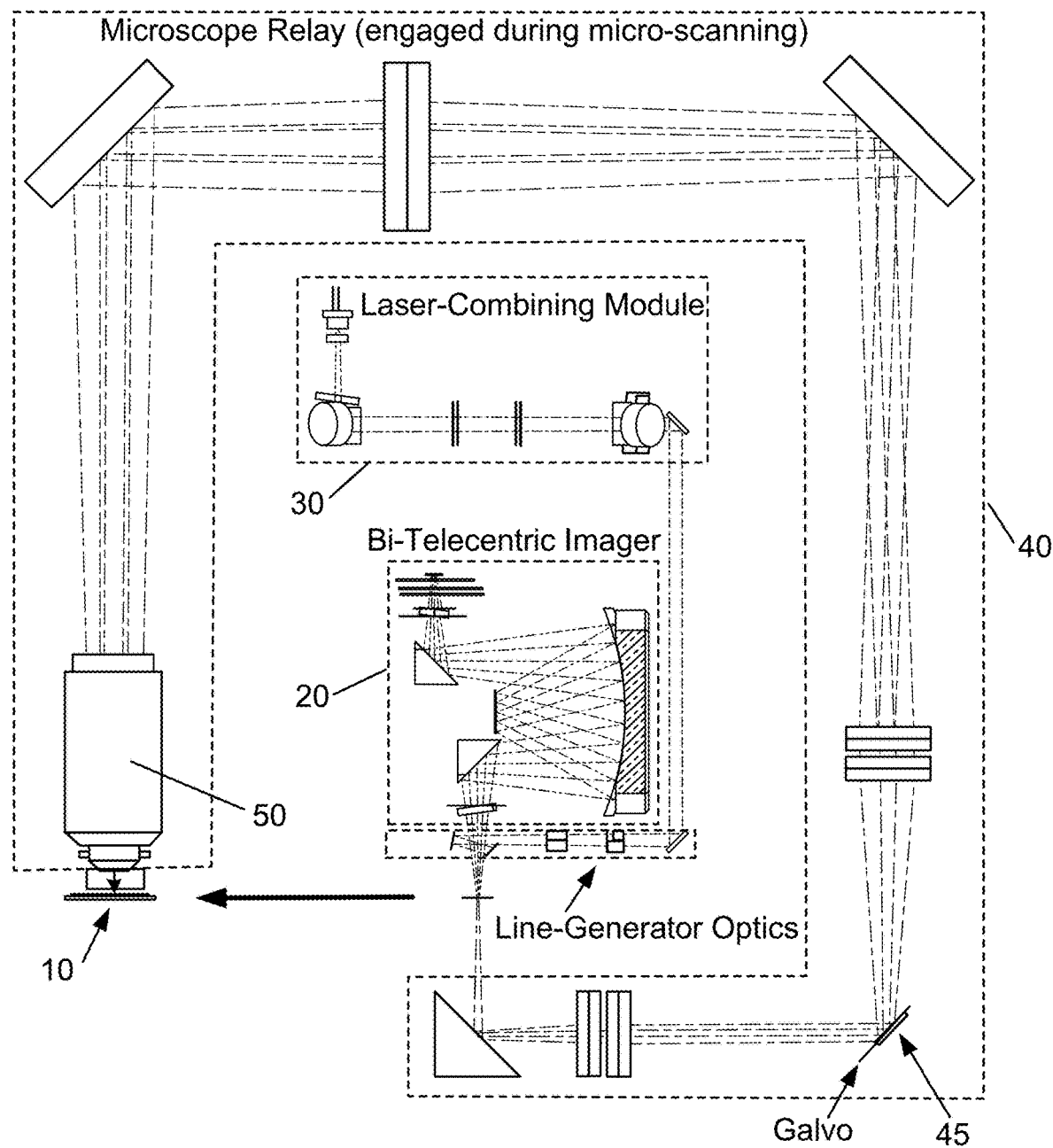
FIG. 2 shows a macro-micro imaging system operating in a micro-scanning mode, according to an embodiment.

The micro-scanning mode advantageously uses the same imaging system 20, e.g., the bi-telecentric line-scanning imager, and projects the illumination beam onto a microscope objective 50 to collect an image of the line at a higher magnification than the imaging system 20, e.g., bi-telecentric imager, gives by itself. The illumination beam or line may be swept through the objective 50 to cover a larger microscopic view, using for example a Galvanometer mirror positioned along the illumination light path. FIG. 2 depicts this micro-scanning mode for fluorescence where laser line illumination is projected through microscope relay optics 40 and through an objective lens 50 onto the desired location and the emitted signal from that location is collected by the objective lens 50 and routed back through the microscope relay optics 40 towards the imaging system 20, e.g., bi-telecentric imager. As an example, in an embodiment, the sample platform may be moved using a servo-motor or stepper motor, or other controllable movement mechanism, from the first location, coinciding with the focal plane of the beam-shaping optics as shown in FIG. 1, to a second location proximal the imaging or focal plane of the objective lens 50 as shown in FIG. 2. The microscope relay optics 40 may include various optical elements configured to receive, condition and redirect the illumination beam through the objective lens 50. The relay optics also may include a scanning mirror 45, e.g., galvanometer mirror, in a light path of the relay optics to control scanning of an illumination line at the focal plane of the objective lens 50. It should be appreciated that the scanning mirror may be positioned anywhere along the light path. Also, during use, in the macro-scanning mode, the relay optics 40 are typically not in use.

Figure 3A:
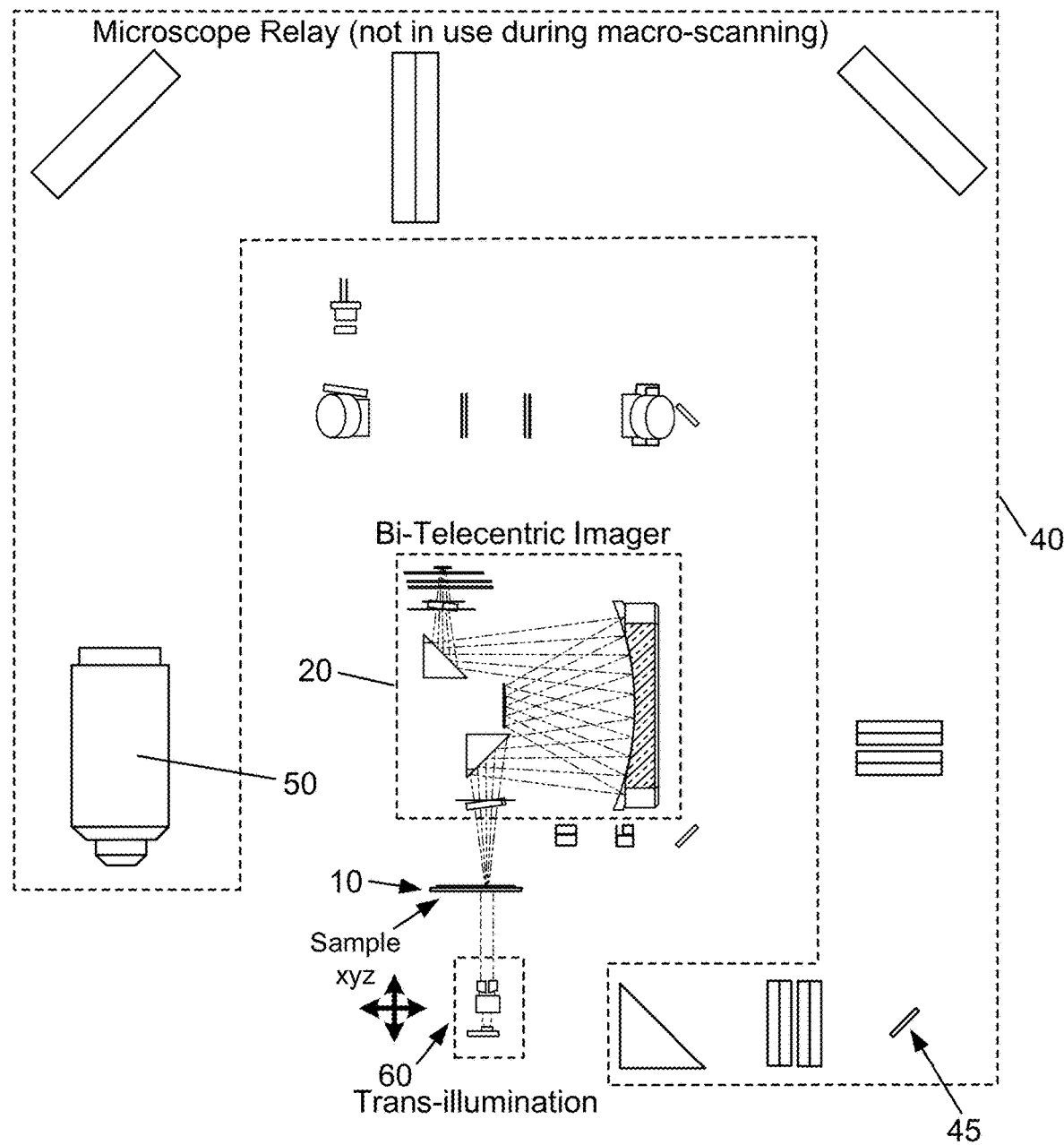
FIG. 3A shows a macro-micro imaging system operating in a trans-illumination macro-scanning mode, according to an embodiment.
Figure 3B:
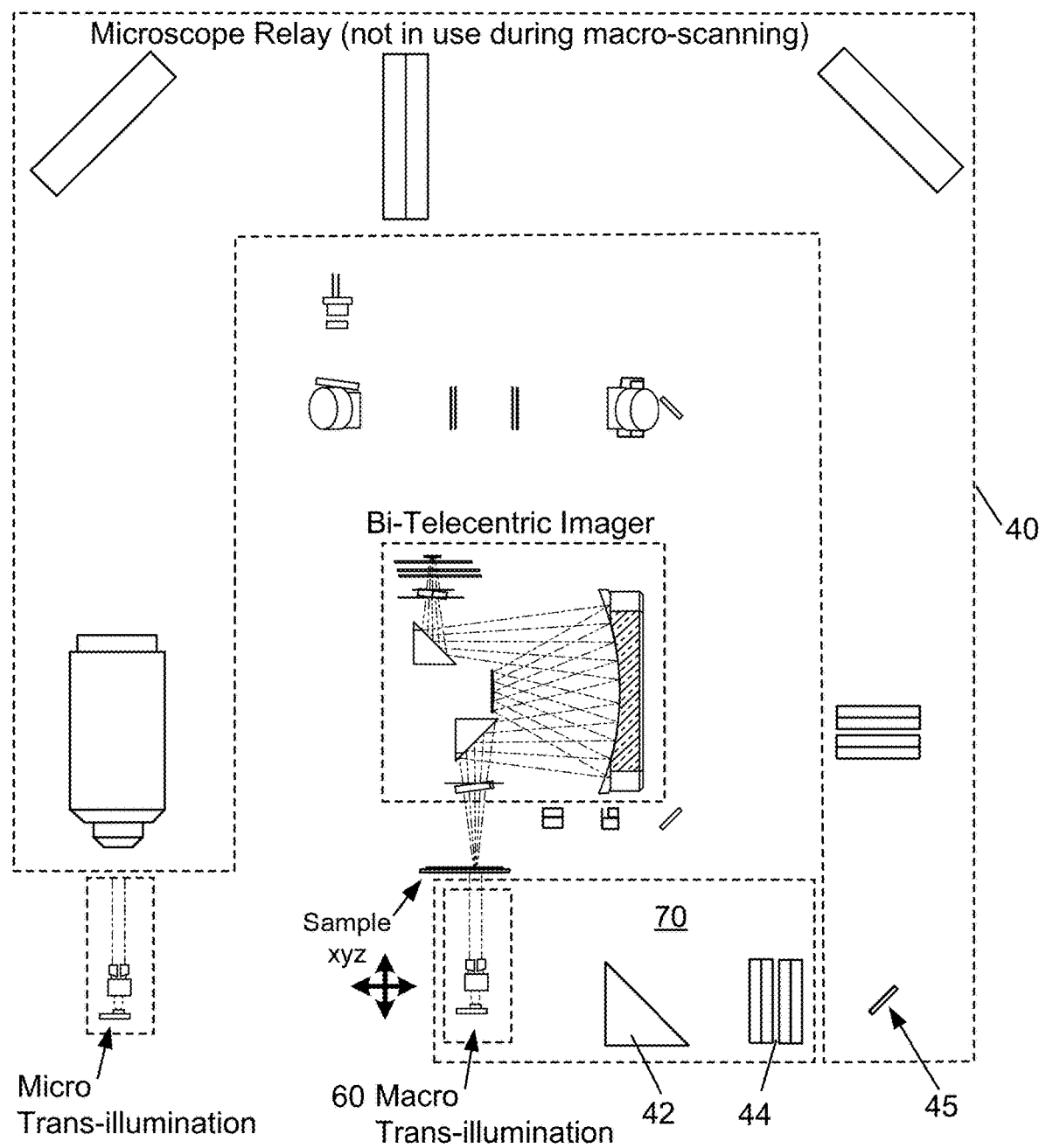
FIG. 3B shows a macro-micro imaging system operating in a trans-illumination macro-scanning mode, according to an embodiment.
Figure 4A:
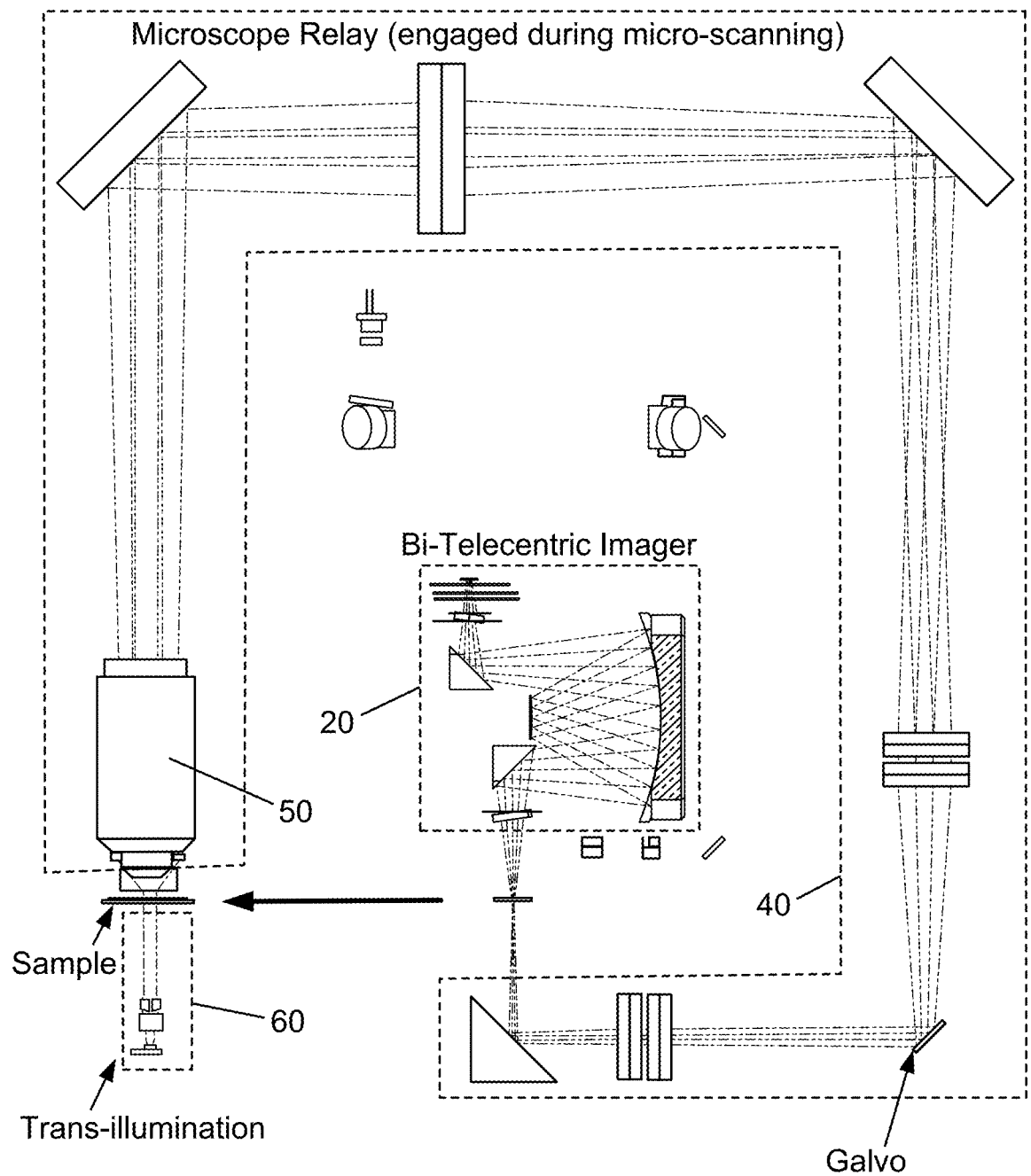
FIG. 4A shows a macro-micro imaging system operating in a trans-illumination micro-scanning mode, according to an embodiment.
Figure 4B:
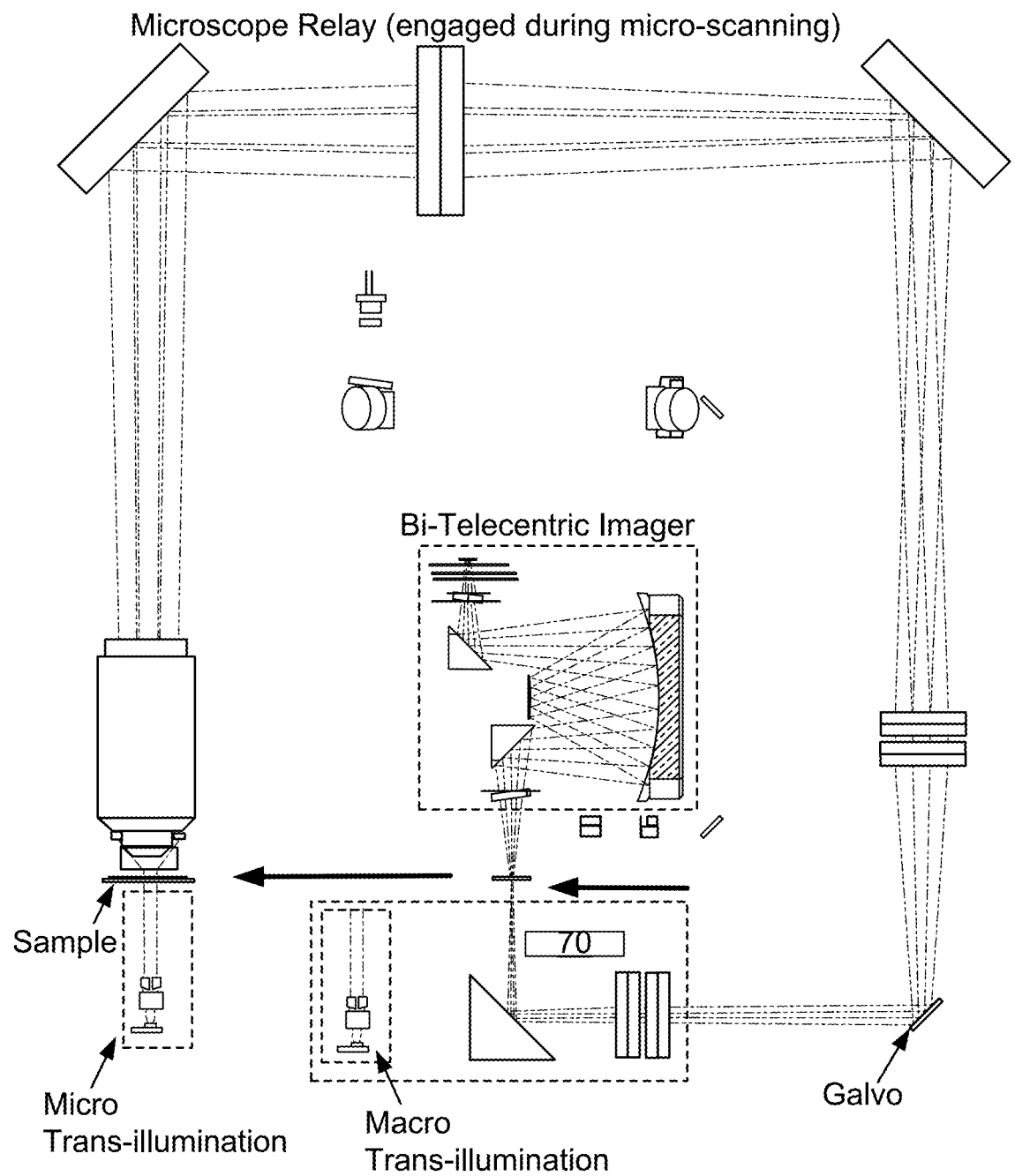
FIG. 4B shows a macro-micro imaging system operating in a trans-illumination micro-scanning mode, according to an embodiment

FIGS. 3A, 3B, 4A and 4B depict macroscopic and microscopic imaging modes using a trans-illumination module 60 according to embodiments. The trans-illumination module 60 includes an illumination source and optical elements configured to direct illumination (e.g., illumination beam or light beam) from the illumination source toward the sample platform 10 from a side opposite the imaging system 20 as shown in FIG. 3A and FIG. 3B. For example, the illumination source of the trans-illumination module 60 may include a laser, LED or other illumination source. In FIG. 3A, the sample platform 10 is located in a first location and illuminated by the trans-illumination module 60. The optical imaging system 20 receives light directly from a portion of the sample platform on a side opposite the trans-illumination module 60. The sample platform 10 is movable, e.g., using a servo motor or stepper motor, relative to the optical imaging system 20 between the first location and a second location proximal the imaging or focal plane of the objective lens 50. In FIG. 3B, trans-illumination module 60 may be physically grouped together as a single moveable unit 70 with the turning mirror 42 and lens 44 of relay optics 40, so that the turning mirror 42, lens 44 and trans-illumination module 60 are movable together (see, e.g., FIG. 4B). In FIG. 4A, the sample platform 10 is in the second location, and light from the portion of the sample platform is directed through the objective lens 50 and the relay optics 40 and to the optical imaging system 20. It should be appreciated that the trans-illumination module 60 may move (and stay in alignment) with the sample platform 10 as shown in FIG. 4A, or a separate trans-illumination module 60' may be used for the micro-imaging mode as shown in FIG. 4B. In the latter case, the single moveable unit 70 comprising the trans-illumination module 60 may be configured to be controllably moved (e.g., with a servo or stepper motor) between a first position as shown in FIG. 3B and a second position as shown in FIG. 4B. Elements of the relay optics 40 may also be moved with the trans-illumination module 60 as a single moveable unit 70 as shown in FIGS. 3B and 4B.

Figure 5:
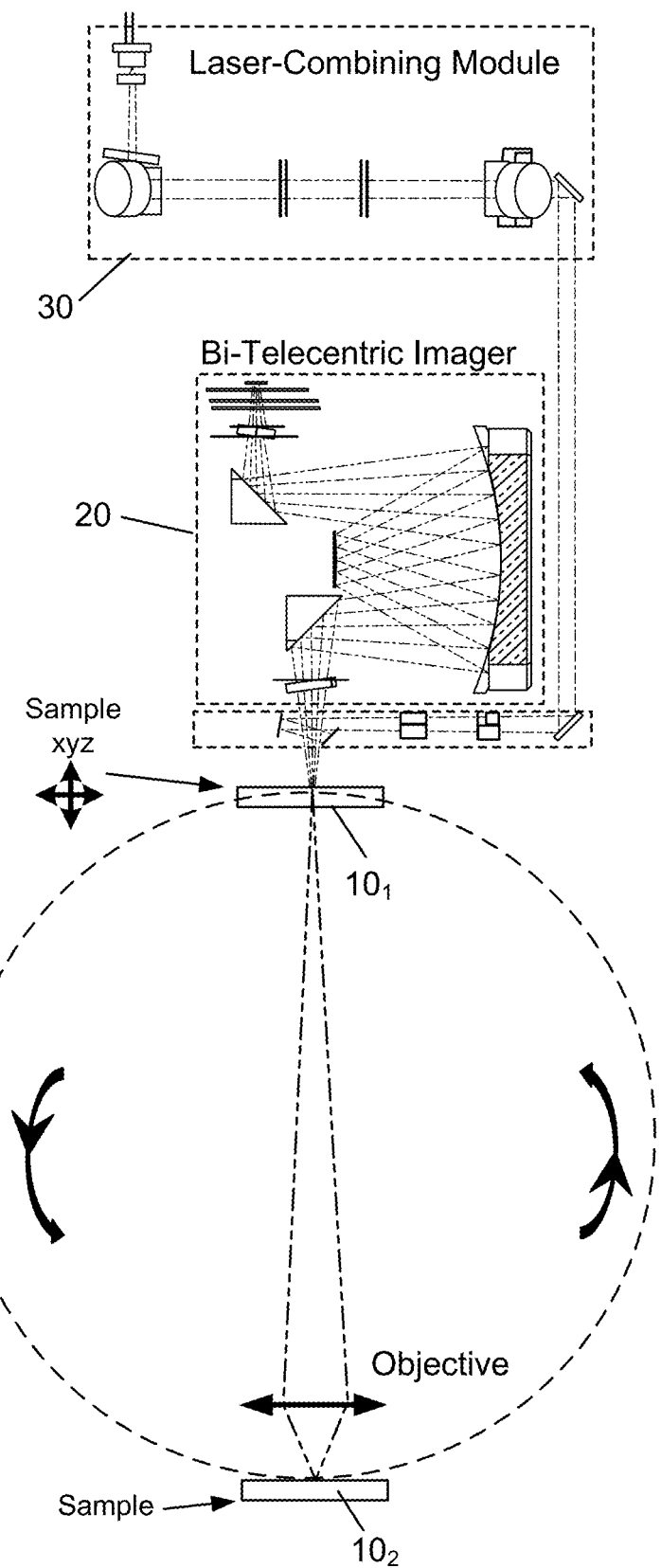
FIG. 5 illustrates a macro-micro switching mechanism configured to switch the macro-micro imaging system between micro-scanning and macro-scanning modes, according to an embodiment.

FIG. 5 shows a macro-micro switching mechanism according to another embodiment. In this embodiment, when in a first position $10_1$, the sample platform is directly illuminated by the illumination system 30, and when in a second position $10_2$, the sample platform is illuminated through an objective lens positioned in an optical path of the illumination beam; light emanating from at least a portion of the sample platform is collected by the objective lens and passes to the imaging system 20. In an embodiment, a mechanical drum or wheel or other translation mechanism may be connected to the sample platform; rotation of the wheel or drum moves the sample platform between the first position $10_1$ and the second position $10_2$.

Figure 6:
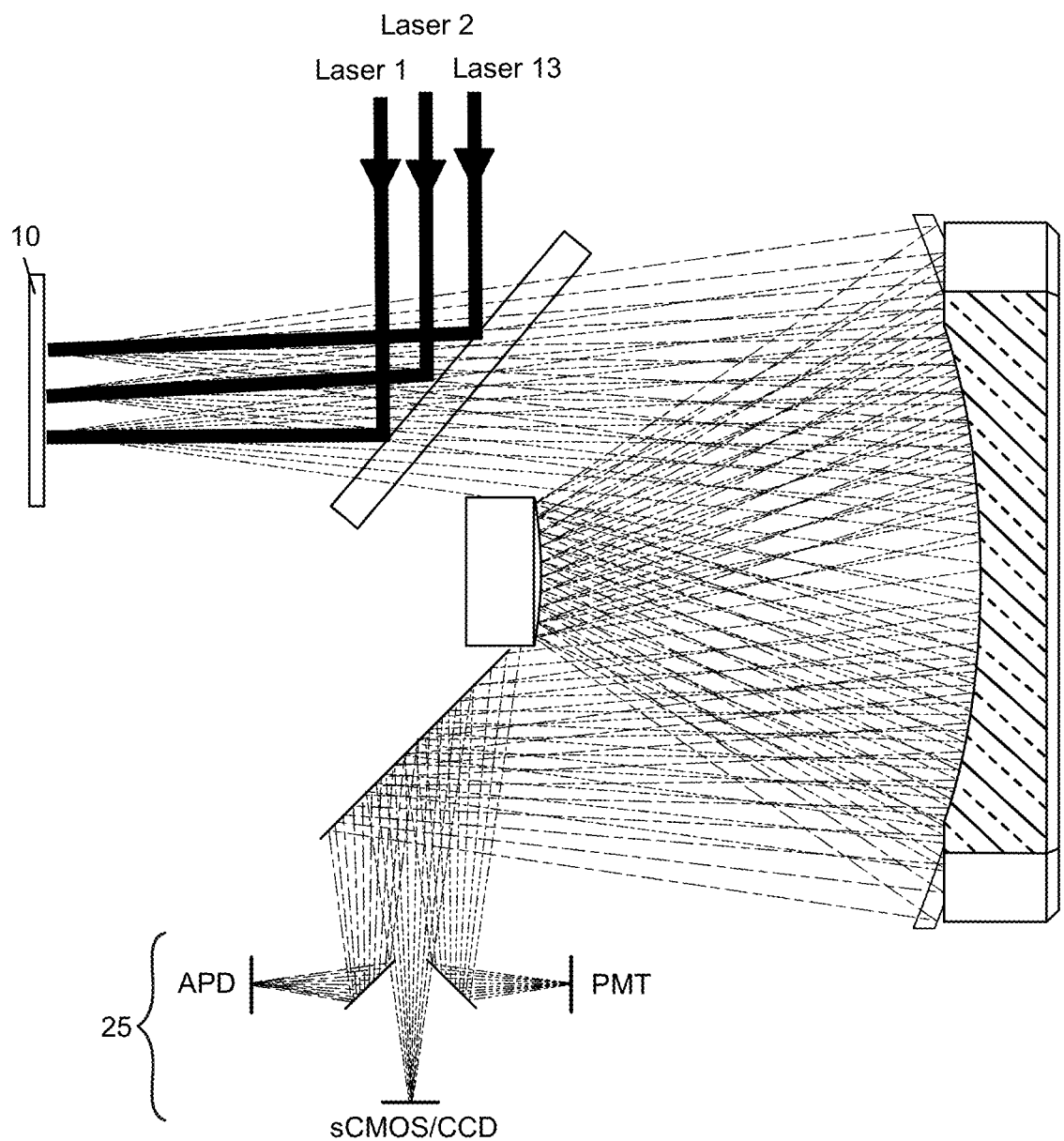
FIG. 6 illustrates an illumination and detection scheme according to an embodiment.

FIG. 6 shows an embodiment wherein more than one point or line may be imaged simultaneously and detected by different detector types as shown, e.g., the detector subsystem may comprise multiple detectors and optical elements such as mirror elements to direct light corresponding to different sources or lines or points as shown.

The embodiments herein easily lend themselves to implementing a number of other imaging modalities typically associated with microscopy such as Confocal Laser Scanning Microscopy (CLSM).

The embodiments described herein are particularly useful with wide-field imaging systems, including but not limited to fluorescence imaging systems, optical imaging systems, or a combination of imaging systems. For example, to image in fluorescence, a one or more targets of interest (e.g., within or on a sample where such targets of interest may contain a fluorescent material, which may be located on a sample platform) is illuminated by an optical signal having a first spectral content (excitation light) where a portion of such a signal is absorbed by at least part of the target of interest and emitted as optical signal of a second spectral content (emission light). The emission light is then detected by a detection system as a measure of the amount of the fluorescent material present in the one or more targets of interest within or on a sample at the designated, illuminated location. Imaging an area of a sample containing one or more targets of interest comprising fluorescent material, therefore, requires excitation light delivered to the one or more targets of interest within or on a sample, an imaging system that collects light from the one or more targets of interest and projects the collected light onto an optical detector (e.g., detector array), and a means to separate the emitted fluorescence light from the portion of excitation light that makes its way through the imaging system. The latter, typically, includes one or more optical interference filters. In certain aspects, relevant filter wavelengths may be anywhere within the ultra-violet to visible to far-red spectrum.

Wide-Field imaging, as considered herein, includes collecting light from a contiguous area and projecting it onto a detector array, such as a CCD or other detectors having an array of sensing locations or pixels, at the same time in a way that preserves the relative locations of each point within the contiguous area. This is different from collecting light from one point at a time and sequentially scanning to a different point in order to cover a larger area, i.e. point scan imaging. It is also different from collecting light from a large area and condensing the total amount of light onto a detector and reading it as total signal. The latter is common for many measurement techniques that do not require specific location information.

One skilled in the art will understand that many types of useful sensors or detectors and arrays of sensors, such as but not limited to CCD and CMOS sensors can be used. Other useful detectors or sensors might include sCMOS sensors, photodiodes, avalanche photodiodes, silicon photomultiplier devices, an array of photomultiplier tubes, a focal plane array, etc.

Figure 7:
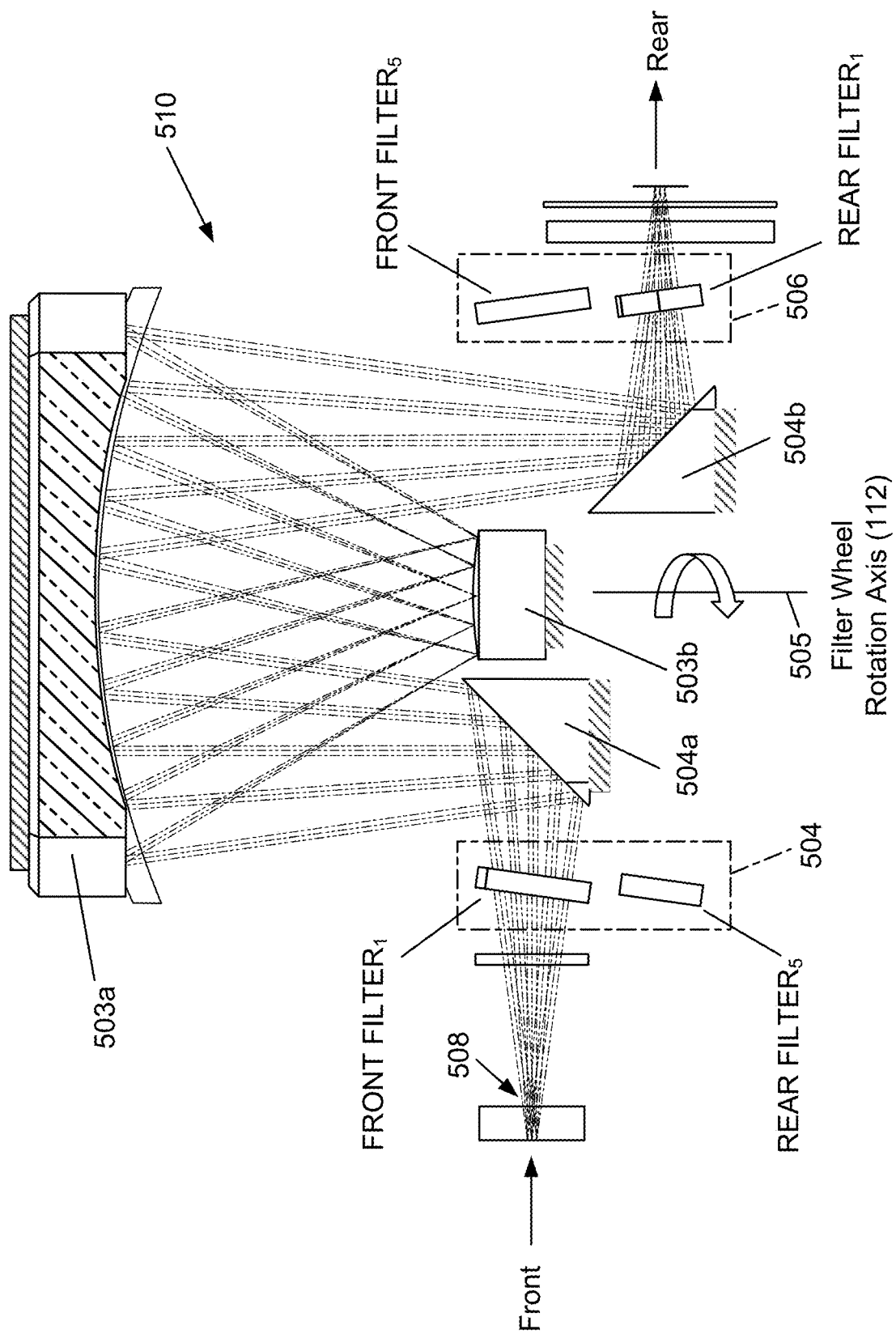
FIG. 7 illustrates a side view of a bi-telecentric imaging system according to an embodiment.

FIG. 7 illustrates a side view of a bi-telecentric imaging system 510 according to an embodiment. Telecentric imaging refers to the case where the Principal or chief rays from all the points being imaged are parallel to each other. A design can be telecentric in the object space where the Principal or chief rays are parallel to each other in the space between the first element of the imaging optics and the sample. On the other hand, a design that is telecentric in the image space has its Principal or chief rays between the last element of the imaging optics and the detector array parallel to each other. Additional aspects and features of bi-telecentric imaging and bi-telecentric imaging systems may be found in U.S. Pat. No. 9,541,750, titled "TELECENTRIC, WIDE-FIELD FLUORESCENCE SCANNING SYSTEMS AND METHODS," which is incorporated herein by reference in its entirety.

The bi-telecentric imaging system shown in FIG. 7 leverages the symmetry present in the mirror system to create both object-space and image-space telecentric areas, enabling placement of both a rejection filter and an emission filter as depicted without sacrificing any light collection capability or imaging performance. For example, a rejection filter may be positioned in the object-space telecentric area 504 and the emission filter may be placed in the image-space telecentric area 506. In this manner, all filtering is done with chief rays parallel to each other and distances between chief rays is unchanged when adjusting focus. The magnification of this imaging technique, and therefore location accuracy, is quite insensitive to focus errors and therefore image-to-image or pass-to-pass registration is very robust. In certain aspects, a rejection filter includes one or more filter elements that reject (or filter out) excitation light wavelengths, while allowing other light wavelengths as desired to pass. Similarly, an emission filter includes one or more filter elements that allow emission band wavelengths to pass, while rejecting other wavelengths as desired. Examples of useful filters include notch filters to block most of the excitation light and band-pass filters to further block any residual excitation light leaking through the notch filter.

In the configuration shown, "Front" indicates an object plane, which may include a sample platform configured to hold a target irradiated by light and "Rear" may include a detector, such as a CCD detector array or other imaging device. A light source (not shown) illuminates the sample platform with light. In certain embodiments, the light source may include one or more laser or LED sources, and various light conditioning and/or light guiding optical elements, configured to illuminate a portion of the sample platform facing toward or away the imaging system 510. The light beam (not shown) may be configured to illuminate an area on the sample platform for area imaging applications, or it may be configured to illuminate a line on the sample for line scanning applications.

As shown, the bi-telecentric optical imaging system may include an Offner relay mirror system arrangement comprising a first mirror element 503a having a spherical mirror surface and a second mirror element 503b having a spherical mirror surface, wherein the entry aperture and the exit aperture each comprise a portion of the first mirror element.

From every point on the sample area being imaged, there is a cone of light 508 that includes a chief ray at its center that travels along a first light path and passes through rejection filter in region 504 in a telecentric way; the chief ray is refocused by Offner mirror elements 503a and 503b to the image side where the chief ray travels along a second light path and passes through the emission filter in region 506 also in a telecentric way before it reaches the detector, e.g., detector array, also perpendicularly to it, in a telecentric way. Folding mirrors 504a and 504b (or other mirrors or components configured to re-direct light) are used to redirect the path for ease of packaging and coupling with filters, e.g., a rotatable filter wheel assembly as will be discussed below. For line scanning embodiments, with this imaging system, a strip area can be imaged in optically under fully telecentric filtering conditions. Larger sample areas may be covered by scanning the sample platform or the imaging system to other different areas and stitching all images together to produce a uniform, contiguous image of the desired total area.

In certain embodiments, the bi-telecentric imaging system includes a multi-position filter wheel assembly. For example, the filters in FIG. 7 may be part of a single-level or multi-level, multi-position filter wheel assembly as described in U.S. Provisional Patent Application Ser. No. 62/767,385, filed on Nov. 14, 2018, and U.S. Patent Application Ser. No. 62/767,385, filed on Nov. 13, 2019, both titled "COMPACT HIGH DENSITY ROTARY OPTICAL FILTER WHEEL ASSEMBLIES," which are both hereby incorporated by reference. Rotation of the filter wheel assembly (and hence the filters located in regions 504 and region 506) about the common axis 512 changes the filter configuration; for example, in a first filter configuration a first one of the first filters is positioned in the first light path in region 504 and the corresponding complementary filter is positioned in the second light path in region 506, and in a second filter configuration a second one of said first filters is positioned in the first light path and the corresponding complementary filter is positioned in the second light path.

The rotatable filter wheel assembly 505 may be manually adjustable and/or rotatable using an adjustment mechanism (e.g., including a stepper motor or other actuator) configured to adjust or rotate the filter wheel assembly to the desired filter configuration responsive to a control signal, e.g., responsive to a control signal received from the control system (not shown). The control system module includes a memory and is further adapted to acquire and store image data taken by the light detector of the detector subsystem.

As shown in FIG. 7, the rotatable filter wheel assembly 505 is arranged in a first filter configuration filter where Front Filter$_1$ is currently positioned in the object-space telecentric area 504 and Rear Filter$_1$ is positioned in the image-space telecentric area 506. Upon controlled rotation of the filter wheel assembly 505 about the axis 512, different filter positions, and hence different filtering capabilities, may be achieved depending on the filter attributes for each position. For example, upon rotation of the rotatable filter wheel, Front Filters may be positioned in the object-space telecentric area 504 and Rear Filters is positioned in the image-space telecentric area 506. In this configuration, for optical imaging (e.g. fluorescence imaging), it may be desirable that each Front Filter act as a rejection filter to filter out the excitation light and each Rear Filter act as an emission filter. As disclosed herein, the rejection filter may include a notch filter or a long-pass filter, and the emission filter may include a band-pass filter or a long-pass filter. For other imaging applications, the Front Filter and the Rear Filter may include optical filters or other components, e.g., windows, as desired. In certain aspects, relevant filter wavelengths may be anywhere within the ultra-violet to visible to far-red spectrum.

Figure 8:
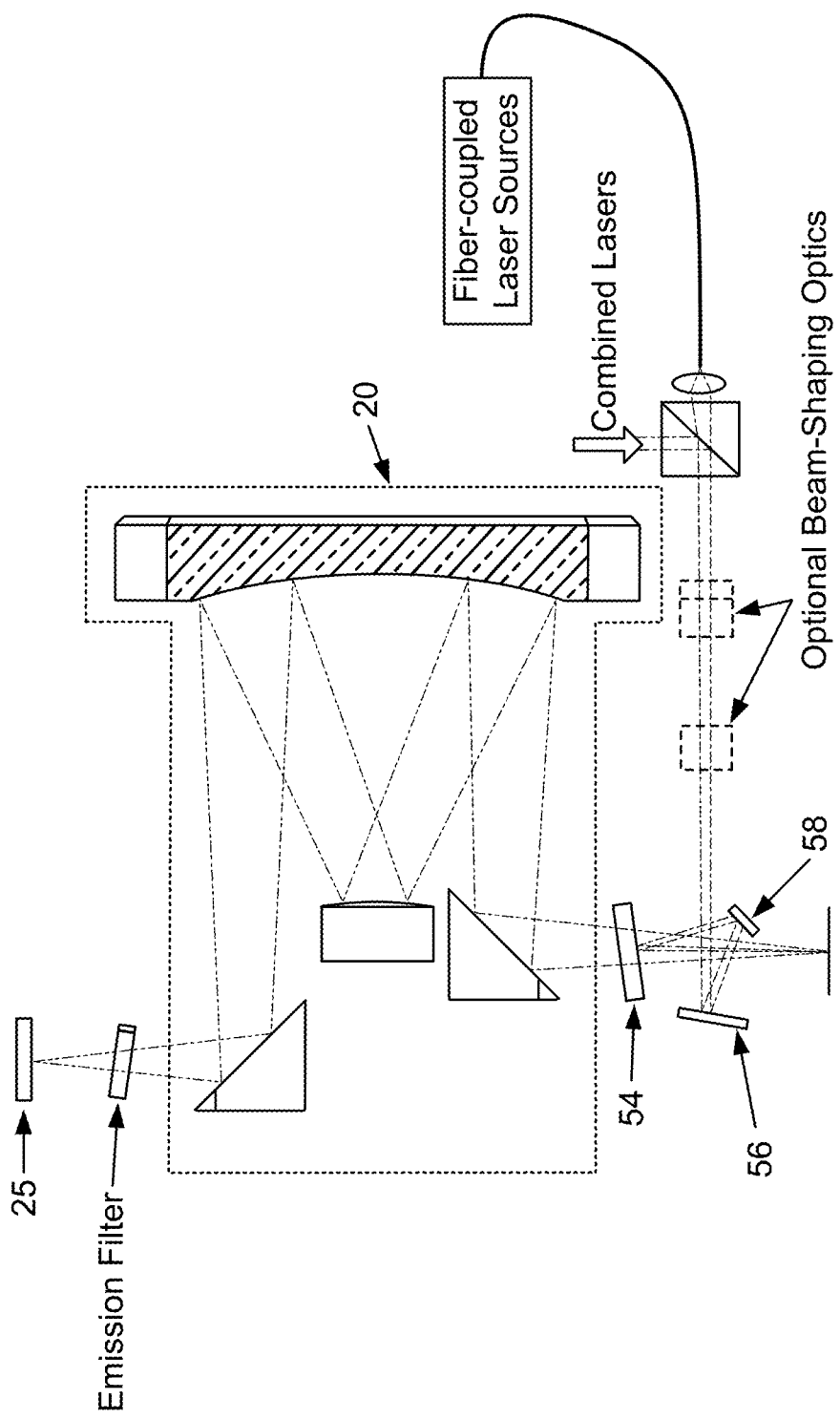
FIG. 8 illustrates a system configuration with a laser excitation light path that is coaxial with the bi-telecentric emission light path according to an embodiment.

FIG. 8 illustrates a system configuration with a laser excitation light path that is coaxial with the bi-telecentric emission light path according to an embodiment. Turning mirrors 56 and 58 are appropriately positioned and configured to redirect the excitation light (e.g., illumination beam from light source system 30) onto a rejection filter 54, which redirects the incident excitation light toward the sample platform 10 in a manner that is coaxial with light emitted from the sample and entering the imaging system 20, e.g., bi-telecentric imaging system. The rejection filter 54 operates to reflect the incident excitation light toward the sample platform 10 and also reject any excitation light coming from other parts of the system, e.g., reflected from the sample platform 10. The incident excitation light may originate from light source system 30 and/or one or more additional sources, such as fiber coupled laser sources as shown in FIG. 8. The system may include additional optical elements for conditioning the excitation light and coupling such sources into the excitation path as would be understood by one skilled in the art.

Figure 9:
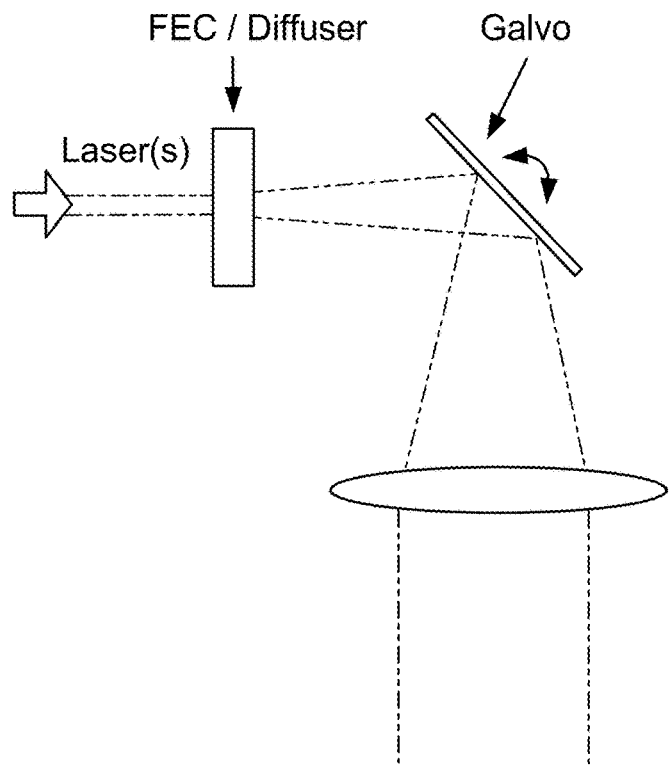
FIG. 9 and FIG. 10 illustrate use of a Fly's Eye Condenser (FEC) element to provide uniform irradiance at the illumination plane according to embodiments.
Figure 10:
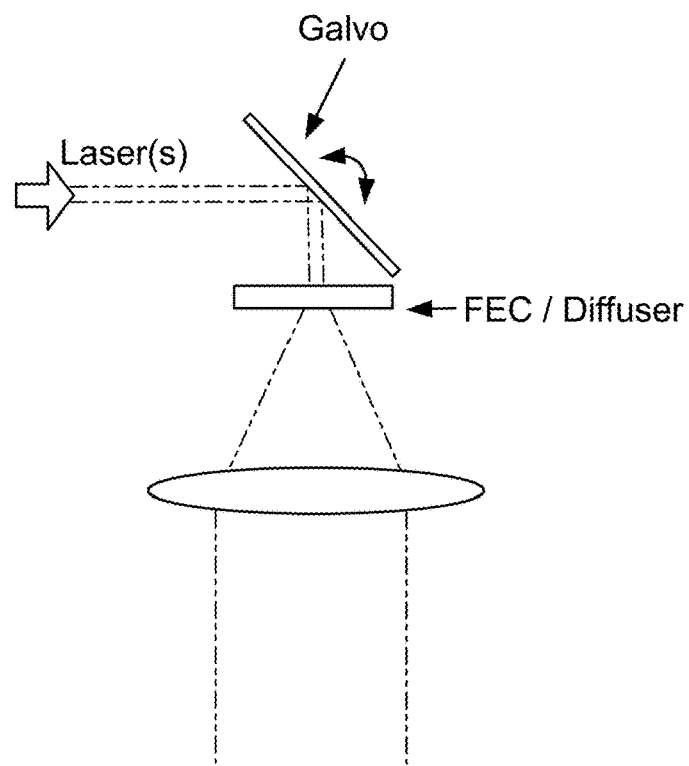

In certain embodiments, a means to provide uniform illumination at the illumination plane, e.g., sample platform may be provided. For example, in the embodiments shown in FIG. 9 and FIG. 10, a Fly's Eye Condenser (FEC) element may be used to provide uniform irradiance at the illumination plane. In certain embodiments, a galvanometer mirror as shown is provided to dither the incident illumination beam and smooth out any coherence related patterns (e.g., fringes). For example, in FIG. 9, the galvanometer mirror is positioned after the FEC in the light path to dither the generated laser line to smooth out (e.g., reduce or remove) any coherence related artifacts or patterns (e.g., interference patterns) that may be present in the optical system. In FIG. 10, the galvanometer mirror is positioned before the FEC in the light path to dither the incident illumination beam across the FEC element to smooth out (e.g., reduce or remove) any coherence related artifacts or patterns (e.g., interference patterns) that may be present in the optical system. It should be appreciated that a FEC element, or similar element, may be used anywhere in an illumination path, whether for macroscopic imaging (e.g., as an element in the beam shaping optics or otherwise in the light path within the light source system 30 or between the light source system 30 and the sample platform 10) or microscopic imaging (e.g., as part of relay optics 40).

In certain embodiments, the range of the galvanometer may be limited to further smooth the profile of the illumination (e.g., line or spot) incident upon the sample platform. For example, use of an FEC element, or similar element, enables limiting the scan range of the galvanometer; the galvanometer does not need to scan more than the spatial period of the coherence induced fringe(s), i.e. the distance between fringe peaks. In this manner, the galvanometer may scan a much smaller angle than it would without the FEC element and therefore can do so at much higher speeds. Additionally, the range of galvanometer sweeps can be used to advantageously effectuate desired small variations to the resulting illumination profile.

Figure 11:
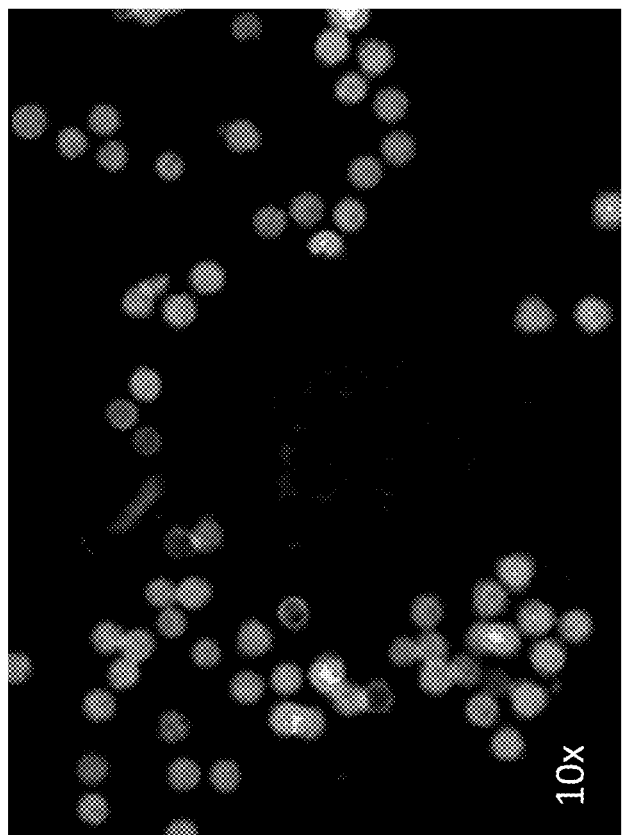
FIG. 11 illustrates typical low (2×) and high (10×) magnification images of a pollen sample using a prior art microscopy system.
Figure 11:
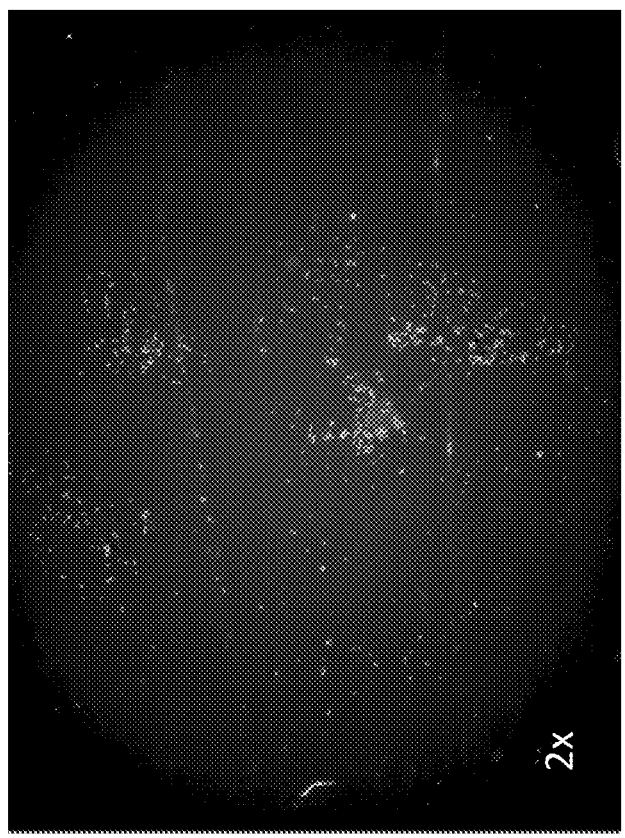
Figure 12:
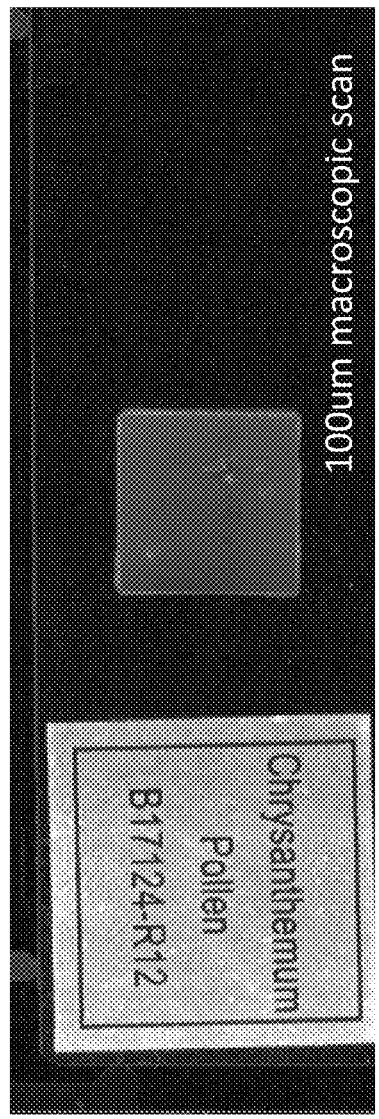
FIG. 12 illustrates macroscopic and microscopic images of the same pollen sample acquired using macroscopic and microscopic modes of an embodiment of a dual mode imaging system.
Figure 12:
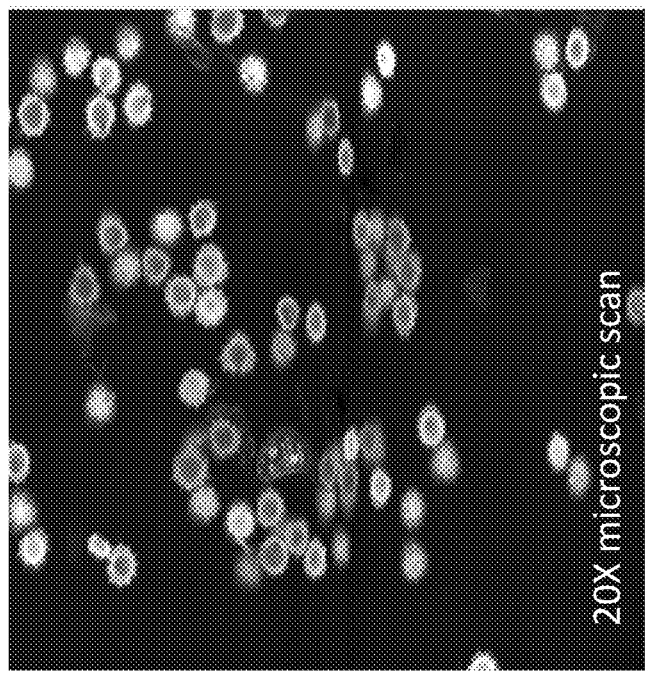
Figure 12:
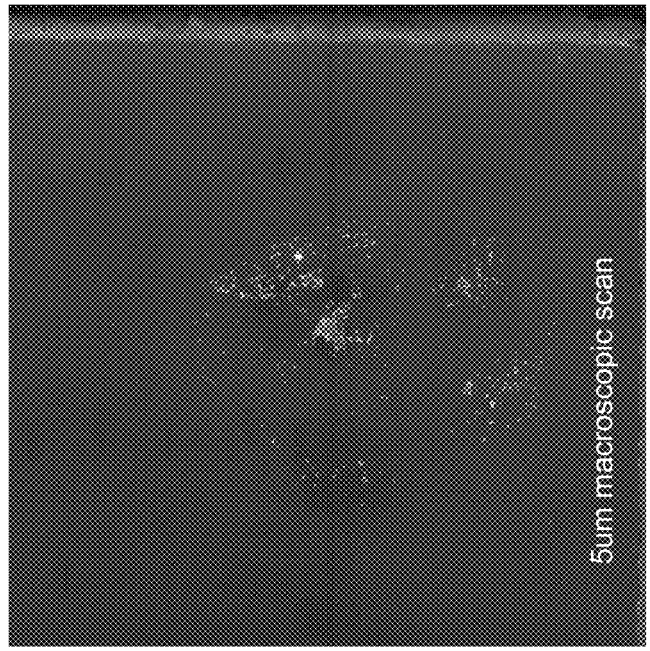
Figure 13A:
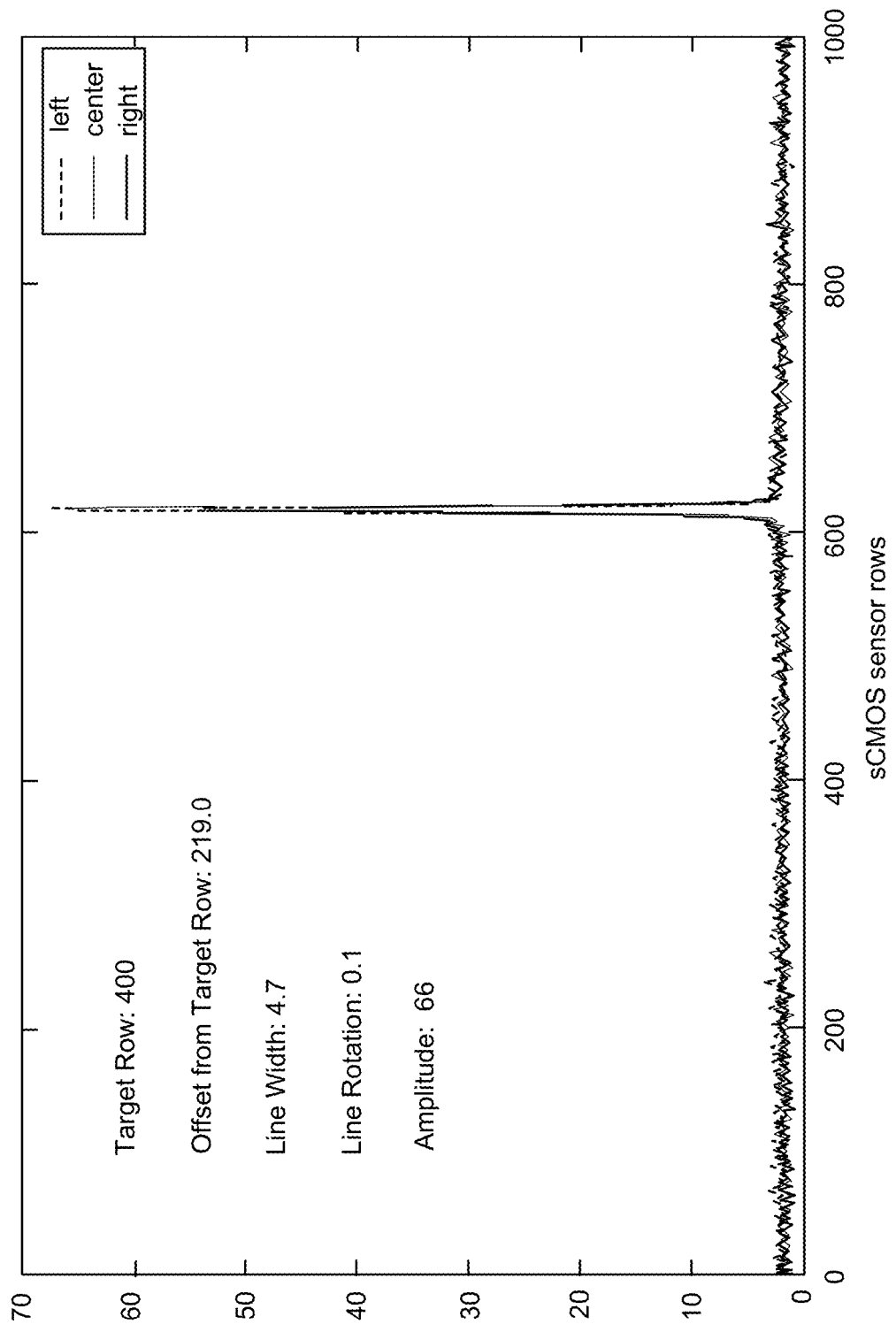
Figure 13B:
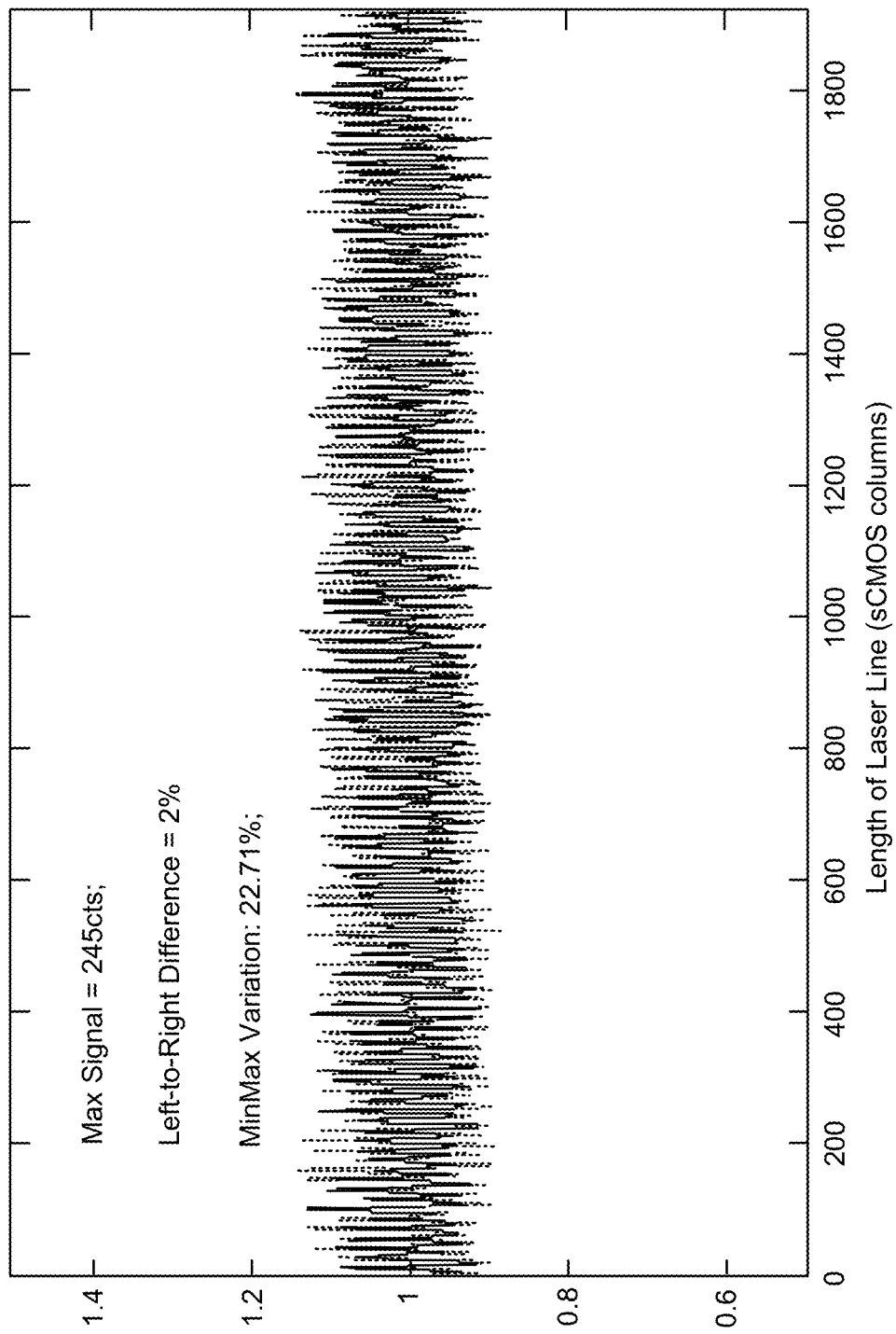
Figure 13C:
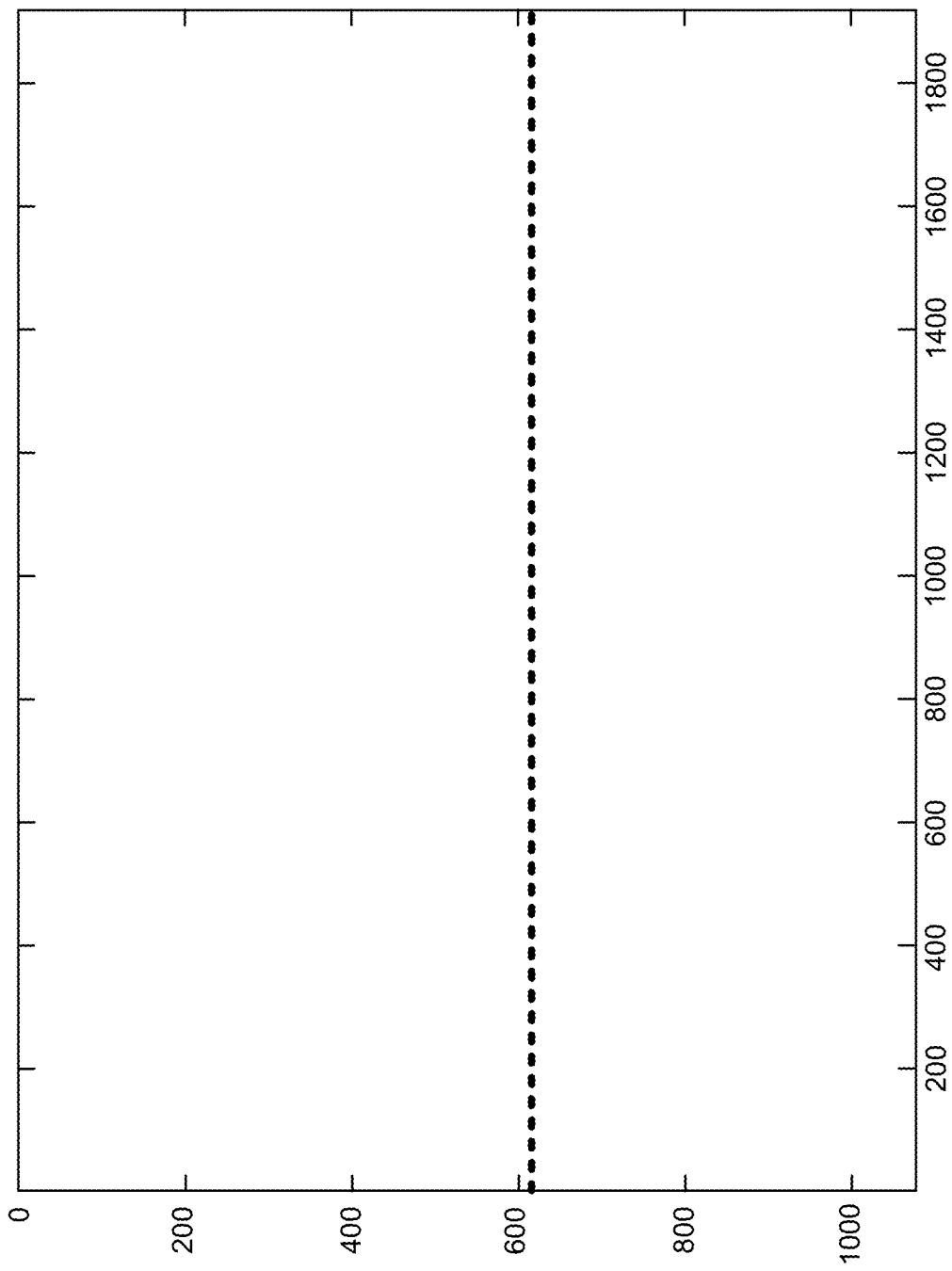
Figure 14A:
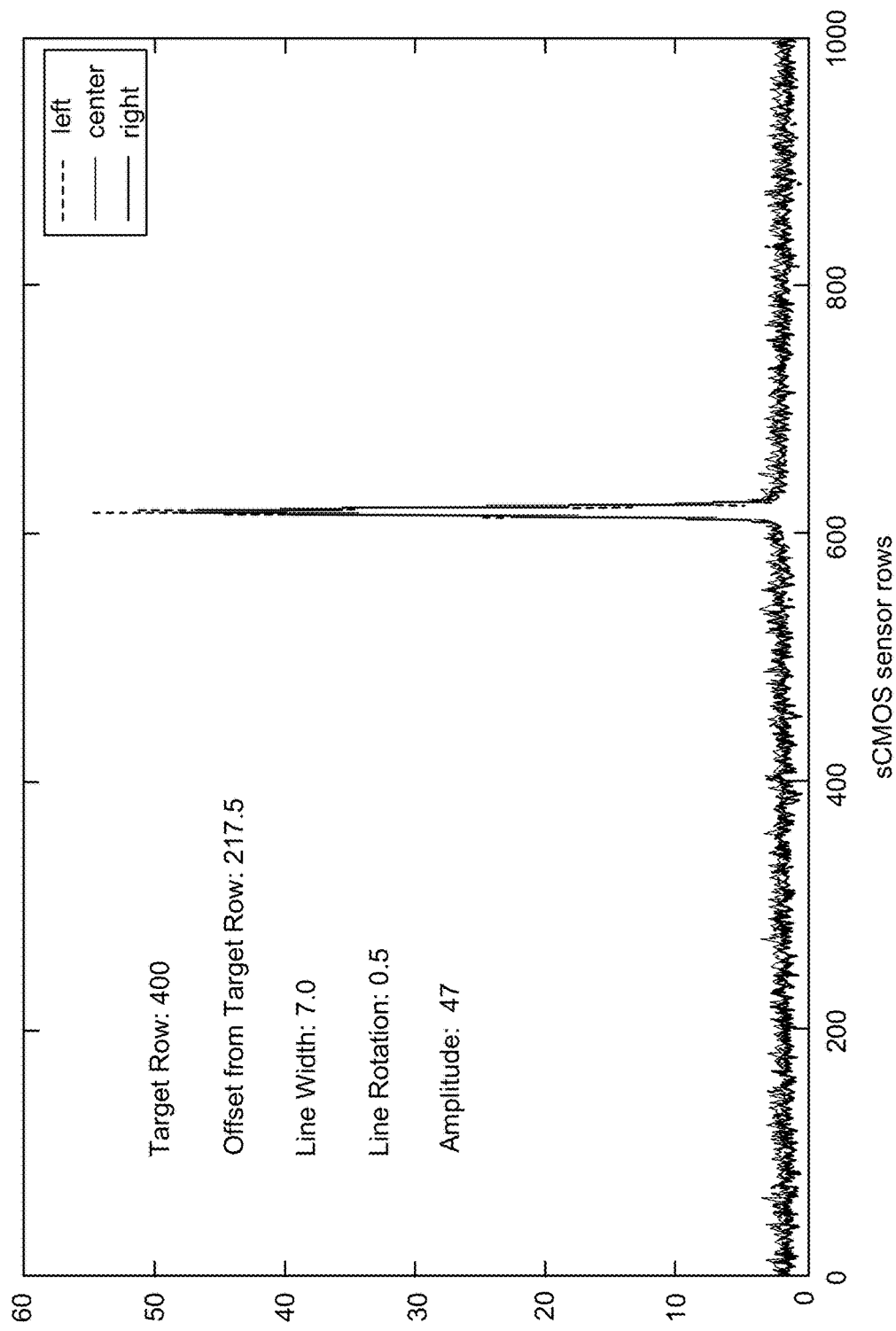
Figure 14B:
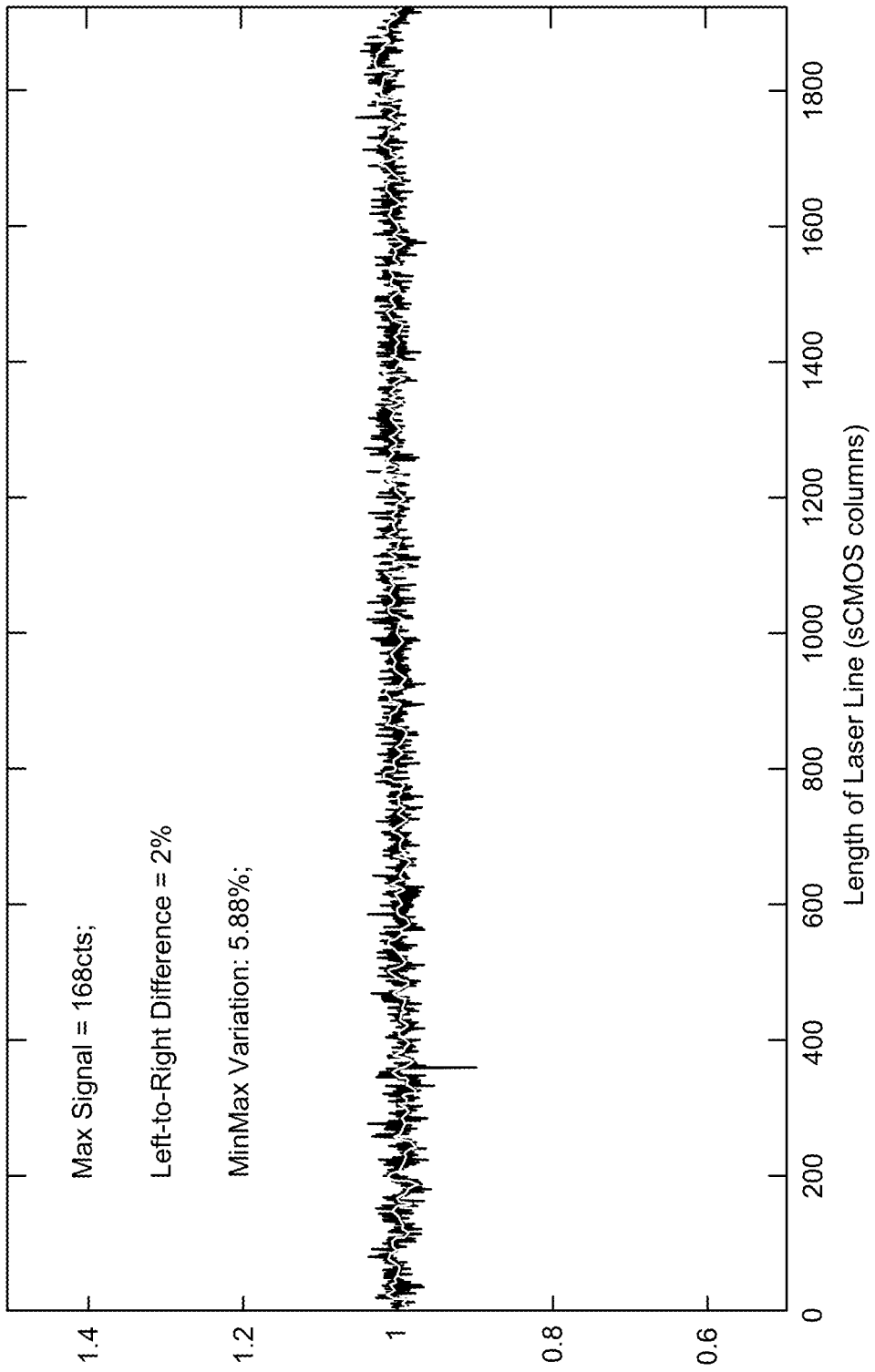
Figure 14C:
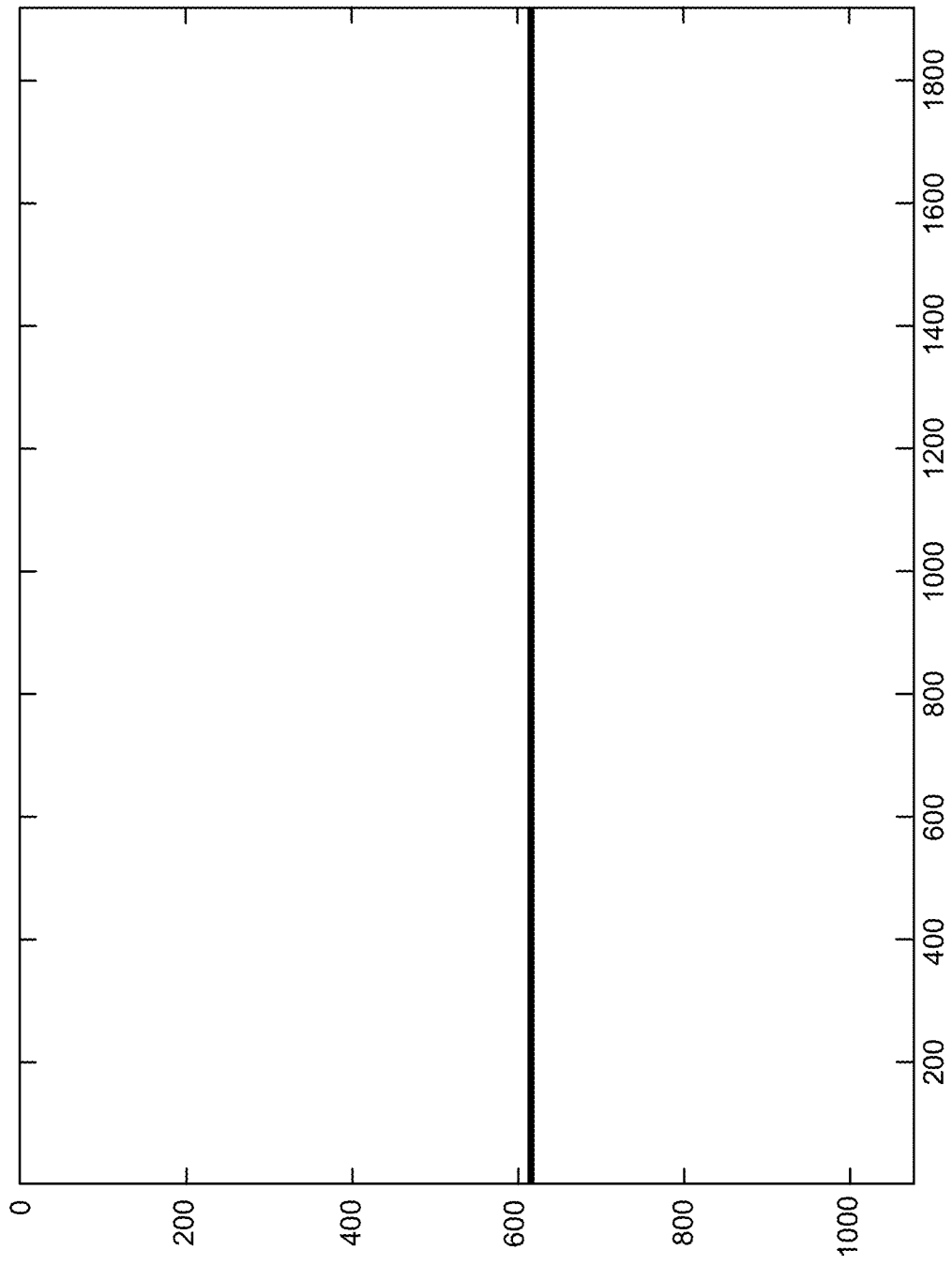

FIG. 11 illustrates typical low (2×) and high (10×) magnification images of a pollen sample using a prior art microscopy system. FIG. 12 illustrates macroscopic and microscopic images of the same sample, as shown in FIG. 11, acquired using macroscopic and microscopic modes of an embodiment of a dual mode imaging system. The upper frame of FIG. 12 shows an image of a 100 µm resolution macroscopic scan of the sample; the frame on the lower left of FIG. 12 shows an image of a 5 µm resolution macroscopic scan of the sample; and the frame on the lower right shows an image of a 20× microscopic scan of a portion of the sample shown in the macroscopic scan images. Acquisition of such images using the dual mode imaging systems and methods herein advantageously save time and resources as the microscopic and macroscopic images may be acquired using the same instrument and in an automated fashion.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

A "target of interest" may include a material or molecule of interest such as a biomolecule. Biomolecules are molecules of a type typically found in a biological system, whether such molecule is naturally occurring or the result of some external disturbance of the system (e.g., a disease, poisoning, genetic manipulation, etc.), as well as synthetic analogs and derivatives thereof (e.g. recombinant). Non-limiting examples of biomolecules include amino acids (naturally occurring or synthetic), peptides, polypeptides, glycosylated and unglycosylated proteins (e.g., polyclonal and monoclonal antibodies, receptors, interferons, enzymes, etc.), nucleosides, nucleotides, oligonucleotides (e.g., DNA, RNA, PNA oligos), polynucleotides (e.g., DNA, cDNA, RNA, etc.), carbohydrates, hormones, haptens, steroids, toxins, etc. Biomolecules may be isolated from natural sources, or they may be synthetic. The target of interest may be, for example, an enzyme or other protein. The target of interest may be a peptide or a polypeptide. The target of interest may be an antibody, antibody-like or a fragment of an antibody. The target of interest may be a nucleic acid molecule. The target of interest may include deoxyribonucleic acids (DNA) or ribonucleic acids (RNA). The target of interest may be a polynucleotide or other polymer. The target of interest may thus be, for example, proteins, nucleic acids, carbohydrates, lipids, or any other type of molecule.

The target of interest may be unmodified or the target of interest may be modified to contain one or more labels. An unmodified target of interest may be visualized through its inherent auto-fluorescent spectral properties during optical imaging. An unmodified target of interest comprising of non-fluorescent or non-excitable material may be visualized through the administration of one or more chemical stains to the sample comprising such unmodified target of interest prior to or during optical imaging. The target of interest may be modified to contain one or more labels through physical conjugation, chemical conjugation, genetic expression, etc. The one or more labels of the modified target of interest may comprise an excitable material. Non-limiting examples of labels include fluorescent materials (e.g. fluorophores or other like materials), phosphorescent materials (e.g. porphyrin or other like materials), bioluminescent materials (e.g. Luciferase expression or other like materials), chromophoric materials (e.g. chromophores or other like materials), etc. Embodiments of label materials of a target of interest may refer to any liquid, solid, or other type of material that absorbs light and re-emits at least a portion of what is absorbed as an optical signal (light) of a different spectral content as a measure of the amount present of that target of interest at that location.

Embodiments of the present invention with optical imaging systems address to imaging targets of interest contained in or on a sample. A "sample" includes and may refer to any liquid, solid, or other type of material that may be comprised of or as, in or on a cell or cells (e.g. in whole or lysed); a slurry or an extraction of cellular components; a tissue or tissues; an organ, organs, organoid or other organ-like materials; organisms such as but not limited to invertebrate or vertebrate organisms (i.e. in whole or in part); substrates such as but not limited to western blots, membranes, gels, plastic media, glass media or other media; or any combination thereof.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A dual mode imaging system, comprising:
   a sample platform configured to hold a sample, the sample platform being movable relative to a bi-telecentric optical imaging system between a first location and a second location; and
   a light source subsystem including an illumination source configured to generate an illumination beam, the light source subsystem comprising beam-shaping optics configured to project the illumination beam onto a part of a focal plane;
   relay optics configured to receive and redirect the illumination beam through an objective lens when the sample platform is in the second location;
   a detector subsystem for detecting light from the sample platform, and comprising a light detector having an array of sensing locations; and
   the bi-telecentric optical imaging system, comprising optical elements configured to receive light from the sample platform and to pass or to direct the received light to the light detector;
   wherein when the sample platform is in the first location, the sample platform coincides with the focal plane, the illumination beam impinges on at least a portion of the sample platform, and the bi-telecentric optical imaging system receives light directly from the portion of the sample platform; and
   wherein when the sample platform is in the second location the illumination beam interacts with the relay optics and impinges on at least a portion of the sample platform through the objective lens and the light from the portion of the sample platform is directed back through the objective lens and the relay optics and to the bi-telecentric optical imaging system.

2. The dual mode imaging system of claim 1, wherein the beam-shaping optics includes one or more optical elements configured to reshape a profile of the illumination beam to a line-shaped profile at the focal plane.

3. The dual mode imaging system of claim 1, wherein the relay optics includes a scanning mirror in a light path of the relay optics.

4. The dual mode imaging system of claim 1, wherein the bi-telecentric optical imaging system includes imaging optics arranged and positioned such that a first telecentric space exists in a first detection light path between the sample platform and an entry aperture, wherein Principal rays from a plurality of field points on the sample platform are parallel to each other when passing through a first filter in the first detection light path, and such that a second telecentric space exists in a second detection light path between the light detector and an exit aperture, wherein the Principal rays from the plurality of field points are parallel to each other when passing through a second filter in the second detection light path.

5. The dual mode imaging system of claim 4, wherein the bi-telecentric optical imaging system comprises an Offner relay mirror system arrangement comprising a first mirror element having a spherical mirror surface and a second mirror element having a spherical mirror surface, wherein the entry aperture and the exit aperture each comprise a portion of the first mirror element.

6. The dual mode imaging system of claim 1, wherein the bi-telecentric optical imaging system is a fluorescence imaging system, wherein the sample includes one or more targets of interest that comprises fluorescent material, and wherein the illumination beam has a wavelength in an absorption band of the fluorescent material.

7. The dual mode imaging system of claim 1, wherein the light source subsystem comprises:
   a single-mode laser configured to output an illumination beam having a single-mode profile;
   a multi-mode laser configured to output an illumination beam having a multi-mode profile, wherein a beam waist size of the multi-mode profile illumination beam is greater than a beam waist size of the single-mode profile illumination beam;

correction optics configured to reduce the beam waist size of the multi-mode illumination beam to substantially the same size as the beam waist size of the single-mode illumination beam;

beam-combining optics configured to combine the single-mode illumination beam and the multi-mode illumination beam into a combined illumination beam along a first illumination light path; and beam-shaping optics configured to shape a profile of the combined illumination beam to a spot-shaped illumination profile at the focal plane.

8. The dual mode imaging system of claim 7, wherein the beam-shaping optics includes a scanning mirror configured to controllably scan the spot-shaped illumination profile so as to form a line-shaped illumination profile at the focal plane.

9. The dual mode imaging system of claim 1, wherein the sample platform being movable includes that one or both of the sample platform and the bi-telecentric optical imaging system is moved relative to the other such that the sample platform is located in one of the first location or the second location relative to the optical imaging system.

10. The dual mode imaging system of claim 1, further including a control system module comprising at least one processor, wherein the control system module is communicably coupled with and adapted to control operation of the light source subsystem, the detector subsystem and a translation mechanism coupled to the sample platform and/or the bi-telecentric optical imaging system and configured to adjust the location of the sample platform relative to the bi-telecentric optical imaging system between the first location and the second location.

11. A dual mode imaging system, comprising:
a sample platform configured to hold a sample;
a detector subsystem for detecting light from the sample platform, and comprising a light detector having an array of sensing locations; and
a bi-telecentric optical imaging system comprising optical elements configured to receive light from the sample platform and to pass or to direct the received light to the light detector;
relay optics configured to receive and redirect the light from the sample platform through an objective lens when the sample platform is in a second location relative to the bi-telecentric optical imaging system; and
an illumination source subsystem configured to generate illumination and direct the illumination to impinge on at least a portion of the sample platform from a side opposite a side on which the bi-telecentric optical imaging system is located;
wherein the sample platform is movable relative to the bi-telecentric optical imaging system between a first location and the second location;
wherein when the sample platform is in the first location, the bi-telecentric optical imaging system receives light directly from a portion of the sample platform; and
wherein when the sample platform is in the second location light from the portion of the sample platform is directed back through the objective lens and the relay optics and to the bi-telecentric optical imaging system.

12. The dual mode imaging system of claim 11, wherein the illumination source subsystem includes a trans-illumination module having a light source configured to emit the illumination and the trans-illumination module is configured to move with the sample platform when the sample platform is moved from the first location to the second location.

13. The dual mode imaging system of claim 11, wherein the illumination source subsystem includes a first trans-illumination module having a first light source configured to illuminate at least a portion of the sample platform when the sample platform is in the first location, and a second trans-illumination module having a second light source configured to illuminate at least a portion of the sample platform when the sample platform is in the second location.

14. The dual mode imaging system of claim 11, wherein the illumination source subsystem includes a light source and illumination relay optics, wherein the light source is configured to illuminate at least a portion of the sample platform directly when the sample platform is in the first location, and wherein the illumination relay optics redirect the illumination from the light source to impinge on the portion of the sample platform when the sample platform is in the second location.

15. The dual mode imaging system of claim 13, wherein the bi-telecentric optical imaging system is a fluorescence imaging system, wherein the sample includes one or more targets of interest that comprises fluorescent material, and wherein the illumination has a wavelength in an absorption band of the fluorescent material.

16. A method of imaging a sample using a dual mode imaging system having an illumination source, a bi-telecentric optical imaging system and a detector system, the method comprising;
providing a sample on a sample platform;
generating an illumination beam by the illumination source;
in a macro-imaging mode:
automatically positioning the sample platform in a first location, wherein the illumination beam impinges directly on at least a portion of the sample platform and wherein light from the portion of the sample platform passes directly to the detector system via the bi-telecentric optical imaging system; and
imaging the sample platform using the detector system; and
in a micro-imaging mode:
automatically positioning the sample platform in a second location, wherein the illumination beam is redirected through an objective lens toward at least a portion of the sample platform by relay optics, and wherein light from the portion of the sample platform passes back through the objective lens and relay optics and to the detector system via the bi-telecentric optical imaging system; and
imaging the sample platform using the detector system, wherein a resolution of the image captured in the micro-imaging mode is greater than a resolution of the image captured in the macro-imaging mode.

17. The method of claim 16, wherein the dual mode imaging system is a fluorescence imaging system, wherein the sample includes one or more targets of interest that comprises fluorescent material, and wherein the illumination beam has a wavelength in an absorption band of the fluorescent material.

18. The dual mode imaging system of claim 1, wherein the beam shaping optics includes a Fly's Eye condenser element.

19. The dual mode imaging system of claim 1, wherein the relay optics includes a Fly's Eye condenser element.

20. The dual mode imaging system of claim 11, wherein the bi-telecentric optical imaging system includes imaging optics arranged and positioned such that a first telecentric space exists in a first detection light path between the sample platform and an entry aperture, wherein Principal rays from a plurality of field points on the sample platform are parallel to each other when passing through a first filter in the first detection light path, and such that a second telecentric space exists in a second detection light path between the light detector and an exit aperture, wherein the Principal rays from the plurality of field points are parallel to each other when passing through a second filter in the second detection light path.

\* \* \* \* \*